(12) United States Patent
Tsuchida

(10) Patent No.: US 8,373,892 B2
(45) Date of Patent: Feb. 12, 2013

(54) MANAGING MODULATION TRANSFER FUNCTION VALUES FOR IMAGE DATA

(75) Inventor: Taro Tsuchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 785 days.

(21) Appl. No.: 12/545,807

(22) Filed: Aug. 21, 2009

(65) Prior Publication Data

US 2010/0053694 A1  Mar. 4, 2010

(30) Foreign Application Priority Data

Aug. 28, 2008  (JP) ................................ 2008-220498

(51) Int. Cl.
 *G06K 15/02* (2006.01)
(52) U.S. Cl. ........................................ 358/1.2; 358/447
(58) Field of Classification Search .................. None
 See application file for complete search history.

(56) References Cited

U.S. PATENT DOCUMENTS

| 7,515,747 | B2 | 4/2009 | Okutomi | |
|---|---|---|---|---|
| 2005/0275907 | A1* | 12/2005 | Crooker et al. | 358/486 |
| 2008/0019611 | A1* | 1/2008 | Larkin et al. | 382/287 |
| 2009/0161169 | A1* | 6/2009 | Muramatsu | 358/447 |

FOREIGN PATENT DOCUMENTS

| JP | 2000-307870 | 11/2000 |
|---|---|---|
| JP | 2005-045433 | 2/2005 |
| JP | 2007-150517 | 6/2007 |
| WO | 2004-068862 | 8/2004 |

* cited by examiner

*Primary Examiner* — Twyler Haskins
*Assistant Examiner* — Christopher D Wait
(74) *Attorney, Agent, or Firm* — Fitzpatrick, Cella, Harper & Scinto

(57) ABSTRACT

An image scanner is provided with a super-resolution processing function for generating a high-resolution image using multiple pieces of low-resolution image data. The scanner device then measures an initial MTF value without performing the super-resolution processing, refers to an MTF properties table in which is registered a number of pieces of low-resolution image data for a scanner device of that type to achieve a pre-set target MTF, and registers the number of images that corresponds to the initial MTF value in the scanner, if that number is present, and registers an interpolated value if that number is not present. The image scanner then performs the super-resolution processing using the registered number of pieces of low-resolution image data, and outputs image data of a target resolution.

4 Claims, 24 Drawing Sheets

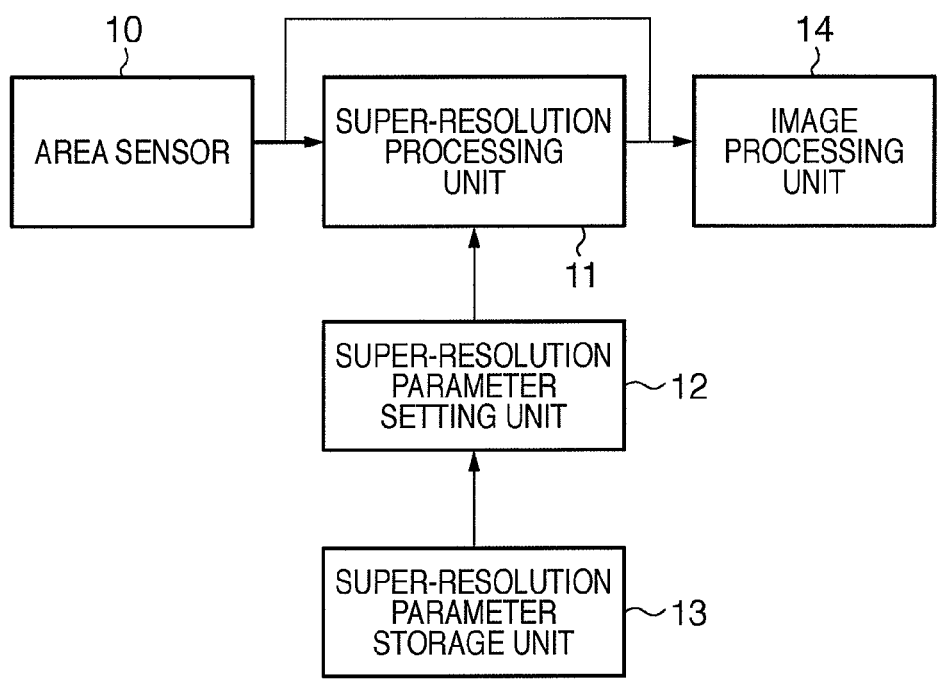
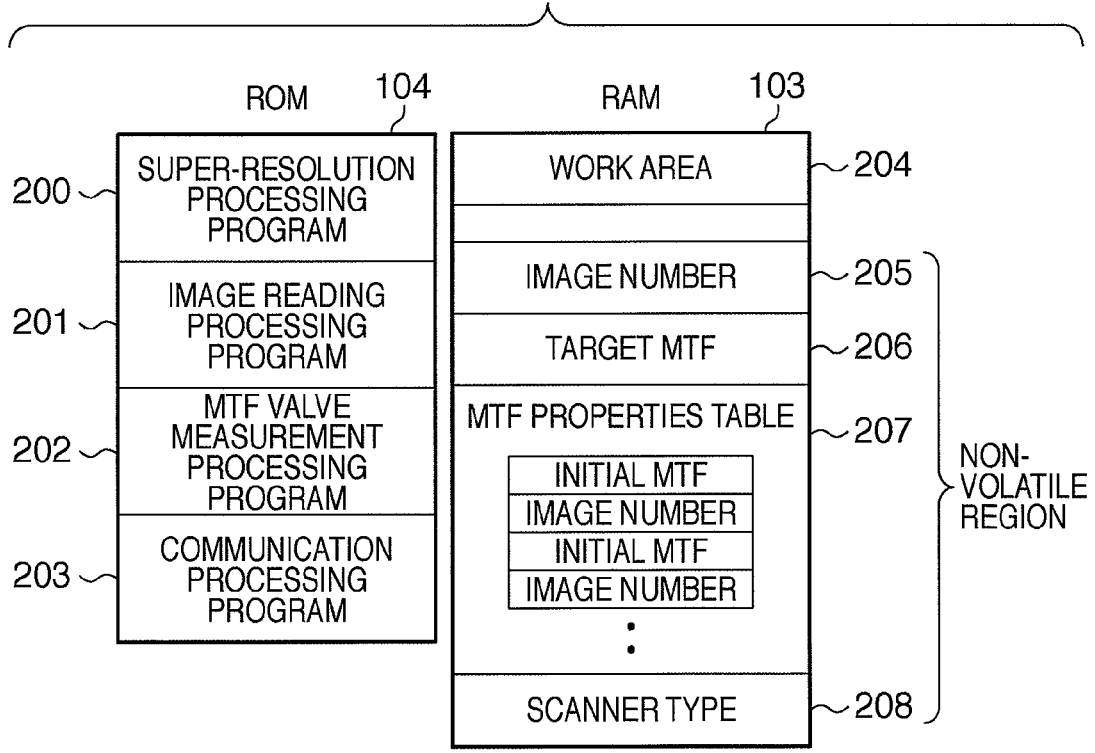

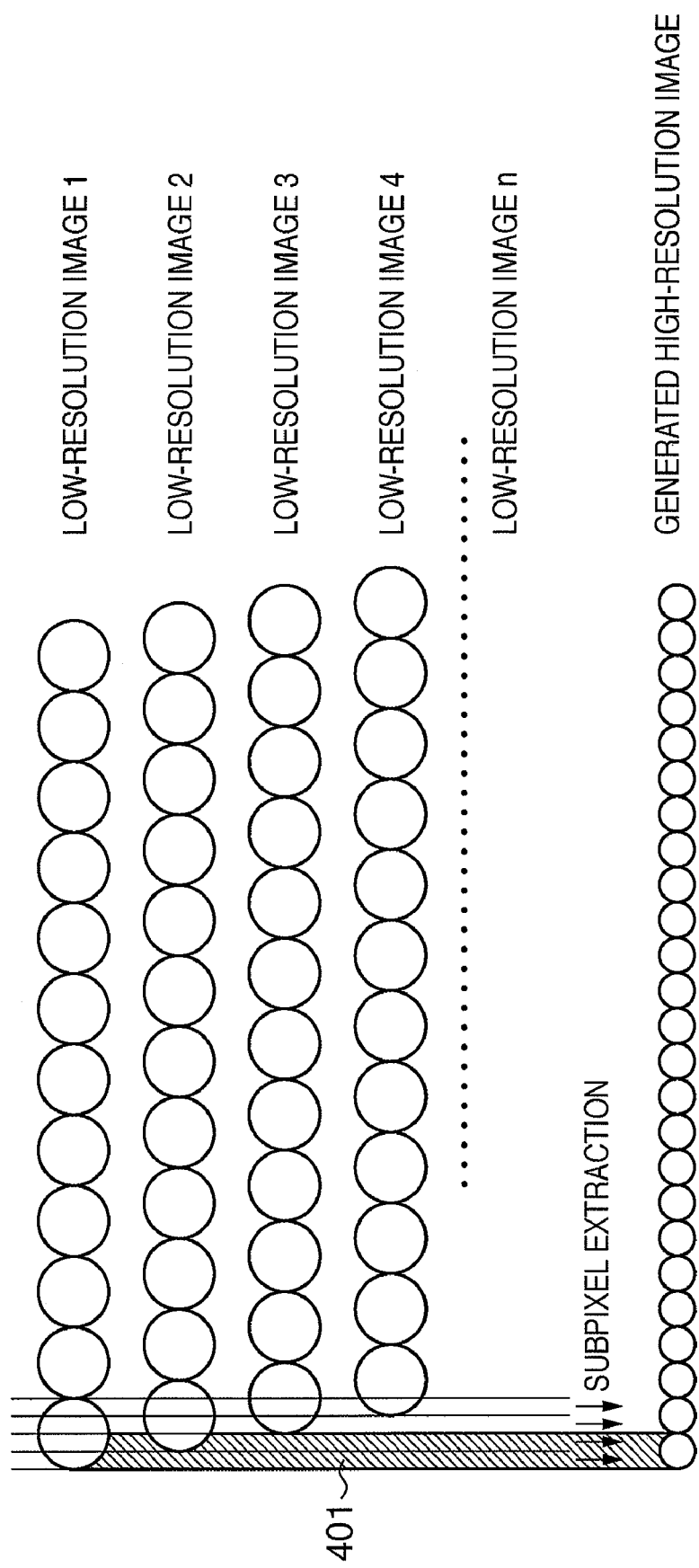

FIG. 6

| DEVICE NAME | MFP-A | MFP-B | MFP-C | IMAGE PROCESSING APPARATUS 300 | IMAGE PROCESSING APPARATUS 301 | IMAGE PROCESSING APPARATUS 302 |
|---|---|---|---|---|---|---|
| SCANNER TYPE | 100 | 100 | 100 | 100 | 200 | 200 |

MTF PROPERTIES TABLE FOR SCANNER TYPE 100

* WITH LINEAR INTERPOLATION

| SCANNER TYPE | 200 | 200 | 100 | 100 |
|---|---|---|---|---|
| TARGET MTF | 70 | 70 | 60 | 60 |
| INITIAL MTF | 50 | 40 | 45 | 30 |
| NUMBER OF IMAGES | 16 | 28 | 26 | 40 |

F I G. 31
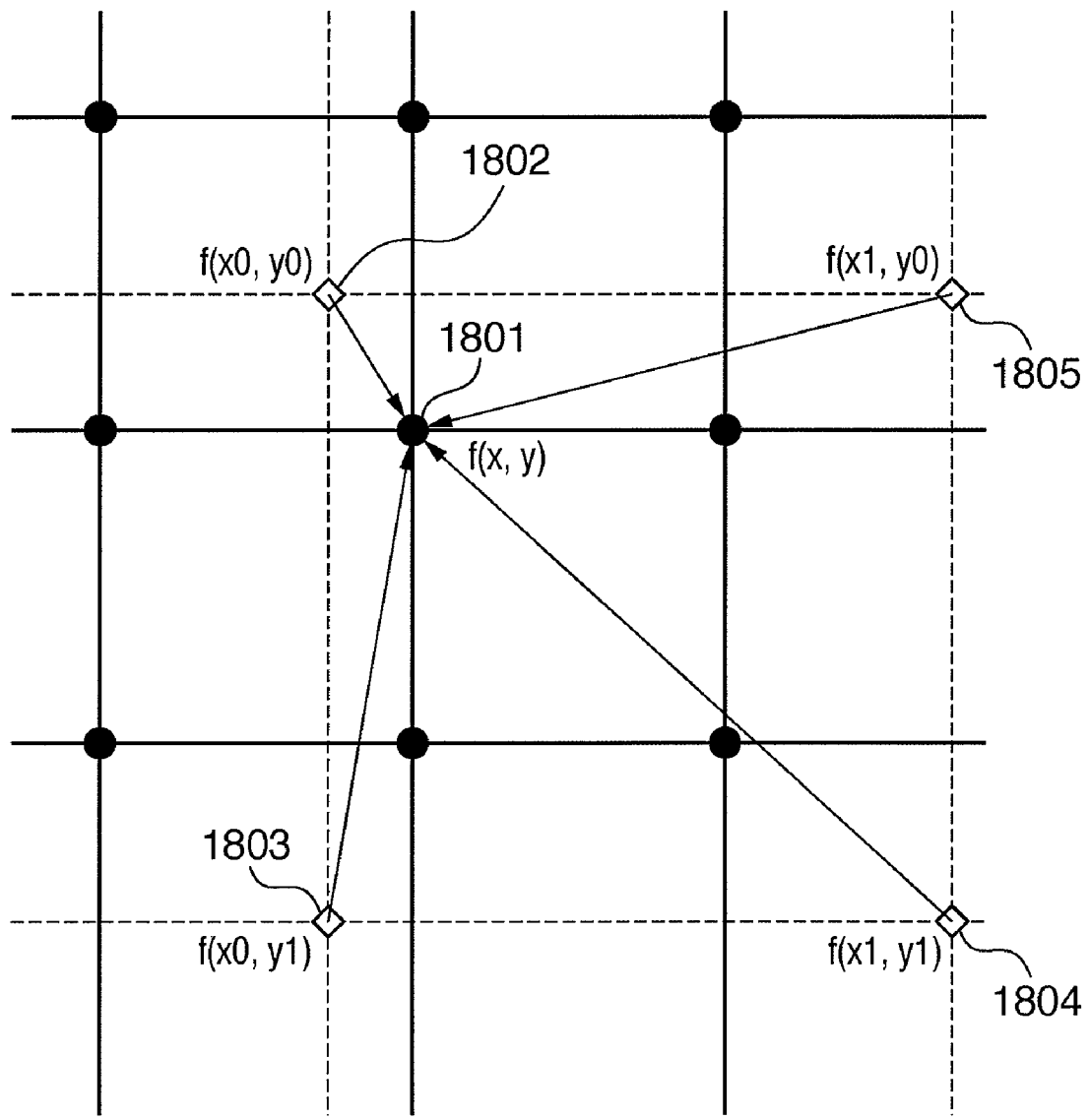
◇ PIXEL IN TARGET LOW-RESOLUTION IMAGE
● PIXEL FOR SUPER-RESOLUTION PROCESSING

MANAGING MODULATION TRANSFER FUNCTION VALUES FOR IMAGE DATA

BACKGROUND OF THE INVENTION

1. Field of the Invention

The present invention relates to an image processing apparatus, image processing method, information processing apparatus, and information processing method, that use, for example, super-resolution techniques.

2. Description of the Related Art

Digital copiers, which read an image of a document using a scanner and make copies using the obtained image data, and image processing systems, which analyze image data and convert that image data into document data, are available as of late. Due to variance in the properties, optical processing, and so on of the scanning elements, scanners that use image sensors such as CCDs, CISs, and so on sometimes experience differences in scanning resolutions, or in other words, differences in Modulation Transfer Functions (MTFs) at the individual scanner unit level.

When the MTF is low, image objects that should have high resolution, such as small characters and the like, experience a drop in image quality, resulting in the characters scanned by the scanner being unreadable, distorted, and so on. For this reason, there are cases where optical character recognition (OCR) carried out on the scanned data cannot successfully extract the characters.

The makers of image processing apparatuses have conventionally set standards of quality with respect to MTFs in scanners and shipped, as products, only scanner devices that meet those standards.

Meanwhile, attempts are being made to use image processing to correct images for which the resolution has dropped and increase the MTF. This correction is called "MTF correction", and many different methods thereof have been proposed.

For example, in Japanese Patent Laid-Open No. 2000-307870 (Patent Document 1), MTF correction is performed by using an MTF correction chart to calculate MTF correction parameters and obtain an MTF filter. In Japanese Patent Laid-Open No. 2005-45433 (Patent Document 2), meanwhile, adjusts the MTFs by adjusting the focus of the image-forming optical system, adjusting the filter coefficients of spatial filters, and so on in order to suppress variations in MTFs between the R, G, and B channels. Finally, Japanese Patent Laid-Open No. 2007-150517 (Patent Document 3) attempts to retain a ground design component by correcting, in accordance with the reading of a ground design pattern, the MTF of the image data based on the degree to which a dotted pattern can be detected in the read image data.

Meanwhile, a technique known as "super-resolution", which improves resolution by using multiple low-resolution images, exists as a technique for correcting resolution (see, for example, WO 2004/068862 (Patent Document 4)). Super-resolution processing is a technique that generates a high-resolution image by extracting subpixels using multiple pieces of image data, each with different phases, obtained from a signal image. Improving the accuracy of this subpixel extraction makes it possible to obtain an image of higher resolution. The accuracy of the extracted subpixels increases proportionally with the number of pieces of low-resolution image data with different phases that are employed.

MTF correction using conventional MTF filters, as described above, does not actually increase the resolution of the image data itself, and is thus limited in how much it can improve resolution. There is also a problem with systems that use multiple scanners in that the results of processing read image data may differ due to variances in the MTFs at the scanner level. For example, there are cases where the results obtained by running an OCR process on a certain document image using a certain multifunction peripheral device (MFP) do not match the results obtained by running an OCR process on the same document image using a different MFP of the same type. This is because the MTFs differ due to individual differences in the scanners.

Furthermore, there is a problem in that the MTF of a scanner will drop due to deterioration in the light source, image sensor elements, and so on occurring over time as the scanner unit is used. The results of scanning processes performed on a certain document image will therefore also deteriorate over time in accordance with the stated deterioration in the MTF. There is therefore a problem in that, for example, characters that were once recognizable when a certain MFP was new become unreadable as time passes, leading to an increase in recognition errors and so on.

SUMMARY OF THE INVENTION

The present invention has been conceived in light of the abovementioned related art. Specifically, first, the present invention resolves individual differences in the MTFs of scanners using super-resolution processing. Second, the present invention provides an image processing apparatus capable of obtaining an optimal image regardless of individual characteristics by resolving the individual differences in MTFs using super-resolution processing. Third, the present invention provides an image processing apparatus that makes MTFs constant between apparatuses when multiple image reading apparatuses are installed, thereby suppressing variance in the reading results, and ensuring that the MTF is constant regardless of which image reading apparatus performed the reading. Finally, fourth, the present invention provides an image processing apparatus that has a stable MTF by suppressing changes in the MTF due to deterioration over time.

According to an aspect of the present invention, there is provided an image reading apparatus comprising: an obtainment unit, configured to read an image and obtains a Modulation Transfer Function (MTF) value of the image; and a super-resolution processing unit, configured to perform super-resolution processing on the image in the case where the MTF value obtained by the obtainment unit is lower than an MTF value specified in advance so that the MTF value of the image becomes the MTF value specified in advance.

According to another aspect of the present invention, there is provided an image reading apparatus comprising: a scanner unit, configured to scan optically an image and outputs multiple pieces of low-resolution image data having a first resolution, each piece of low-resolution image data having its phase shifted relative to the other pieces of low-resolution image data; a super-resolution processing unit, configured to generate high-resolution image data having a second resolution higher than the first resolution using the multiple pieces of low-resolution image data outputted by the scanner unit; and a saving unit, configured to save the number of pieces of low-resolution image data used by the super-resolution processing unit, wherein the number saved in the saving unit is a value whereby the resolution of the high-resolution image data generated by the super-resolution processing becomes a resolution specified in advance.

According to still another aspect of the present invention, there is provided an information processing apparatus comprising: a table, configured to save a first Modulation Transfer Function (MTF) value in association with a number of pieces of low-resolution image data, having the first MTF value, necessary when generating, though super-resolution processing using the low-resolution image data, high-resolution image data having a second MTF value that is higher than the first MTF value; a determination unit, configured to obtain information indicating the resolution of an image read without performing super-resolution processing from an image reading apparatus having a super-resolution processing function, and determine a number corresponding to the resolution by referring to the table; and a unit, configured to output the number determined by the determination unit.

According to the present invention, the MTF of scanned image data can be kept constant regardless of individual differences, model differences, and so on of scanners. This prevents a drop in yield caused by variance in the resolutions in scanner products, and makes it possible to correct changes in resolution caused by deterioration over time.

Further features of the present invention will become apparent from the following description of exemplary embodiments with reference to the attached drawings.

BRIEF DESCRIPTION OF THE DRAWINGS

FIG. 2 is a block diagram illustrating the internal configuration of a scanner unit according to first and second embodiments of the present invention.

FIG. 3 is a diagram illustrating the content of a ROM and a RAM according to an embodiment of the present invention.

FIG. 4 is a diagram schematically illustrating super-resolution processing according to an embodiment of the present invention.

FIG. 6 is a correspondence table for image processing apparatuses and scanner types according to an embodiment of the present invention.

FIG. 31 is a diagram illustrating an example of super-resolution processing.

DESCRIPTION OF THE EMBODIMENTS

Figure 1:
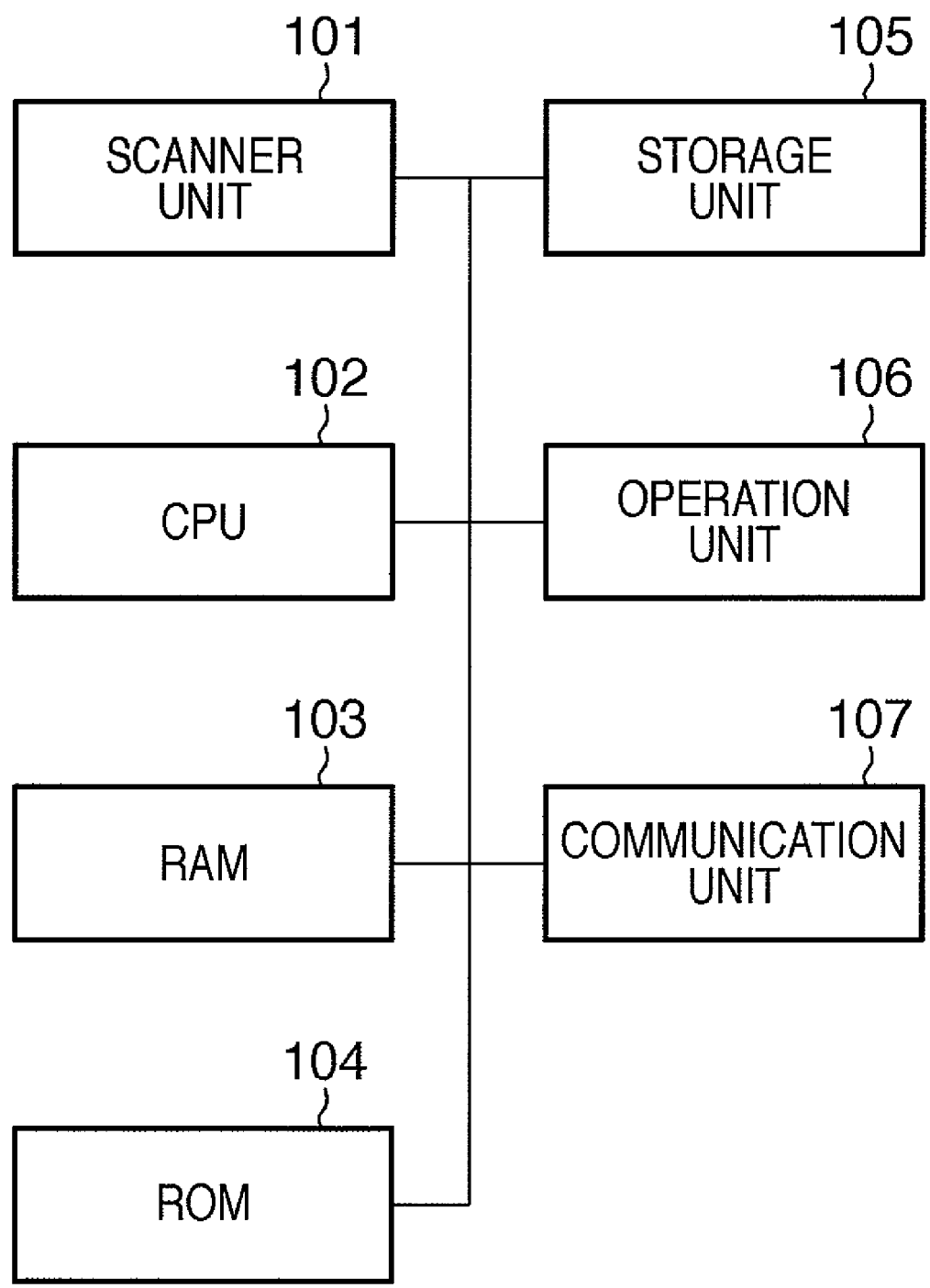
FIG. 1 is a block diagram illustrating an image processing apparatus according to an embodiment of the present invention.

Embodiments of the present invention shall be described in detail hereinafter with reference to FIGS. 1 through 31. In the embodiments, a scanner unit having super-resolution processing functionality reads an image by optically scanning that image, and performs super-resolution processing on the image data that has been read so as to achieve a target MTF (Modulation Transfer Function). To achieve this, an information processing apparatus such as a computer determines the number of pieces of image data necessary to set the initial MTF of the image reading apparatus (an indicator value of a first resolution) to the target MTF, based on an MTF properties table and the initial MTF. Here, the MTF properties table is a table that associates the number of pieces, necessary for super-resolution processing, of low-resolution image data having the first resolution with the initial MTF, in order to set the measured initial MTF value (a first resolution) to the target MTF value. The number of pieces of image data is registered in the MTF properties table in association with multiple different initial MTFs, for each type (model) of image reading apparatus. The MTF properties table is created by an information processing apparatus such as a computer.

Here, the "initial MTF value" refers to the MTF when a piece of image data is outputted without first performing super-resolution processing. The MTF properties table is then referred to based on that initial MTF value, and the number of pieces of low-resolution image data to be used in the super-resolution processing is obtained; that number is then stored in the image processing apparatus. The scanner unit then executes super-resolution processing on the determined number of pieces of low-resolution image data of the first resolution, thereby generating high-resolution image data of a second resolution, the second resolution being higher than the first resolution.

In the descriptions of the embodiments, the Modulation Transfer Function (MTF) is used as the resolution of the image scanner (also called simply a "scanner") that serves as the image reading apparatus. The unit of the MTF used in the embodiments is a percentage, and an MTF of 100% indicates a relationship in which the input and output are equal. The MTF is an indicator value showing how faithfully the original scanned image can be reproduced, and is, for example, expressed as the ratio of the contrast of the scanned image to the contrast of the original image. In other words, an MTF of 1 (that is, 100 percent) indicates that the original scanned image has been reproduced in its entirety in the resulting image data. Because the MTF can change depending on frequencies, it is generally expressed as frequency characteristics using a spatial frequency as parameters; however, an MTF for a predetermined spatial frequency may also be employed as the MTF of the apparatus. For example, in the embodiments of the present invention, the MTF is used as an indicator value of the scanner resolution, and therefore a sample image having a spatial frequency corresponding to a predetermined target resolution can be read, the MTF of the resulting image data measured, and the measured value used as the MTF.

<Configuration of Image Processing Apparatus>

FIG. 1 is a block diagram illustrating an image processing apparatus, such as a digital multi-function peripheral, according to an embodiment of the present invention. A scanner unit 101 is a unit that reads an original and converts the resultant into image data. The scanner unit 101 has a mechanism for efficiently reading low-resolution image data to be applied in super-resolution processing, and is capable of executing such super-resolution processing and outputting high-resolution image data (in the embodiments, image data of a specified resolution). This shall be described in detail later with reference to FIGS. 2 and 26. A CPU 102 performs various types of control with respect to the image processing apparatus. The RAM 103 includes a work region for loading programs by which the CPU 102 performs the stated various types of control, as well as a non-volatile region in which various types of parameters for reading processing are stored. A ROM 104 stores the programs by which the CPU 102 performs the stated various types of control. A storage unit 105 is a unit that stores the image data read and on which image processing was performed by the scanner unit 101 in a storage medium. An operation unit 106 is used by an operator to instruct the start of control for reading an original document, and displays the status of the image processing apparatus, various errors, and so on. A communication unit 107 exchanges information with external devices over a network.

FIG. 2 is a block diagram illustrating the configuration of the scanner unit 101 in the image processing apparatus according to first and second embodiments of the present invention. As shown in FIG. 2, in the scanner unit 101, image data read through an area sensor 10 undergoes super-resolution processing performed by a super-resolution processing unit 11 based on parameters set in advance by a super-resolution parameter setting unit 12. Post-super-resolution processing image data is generated as a result. Thereafter, the image data passes through an image processing unit 14, which determines the attributes and so on of the read image, and read image data is generated; this data is then stored in the RAM 102, the storage unit 105, or the like.

<Configuration of Scanner Unit>

Figure 26:
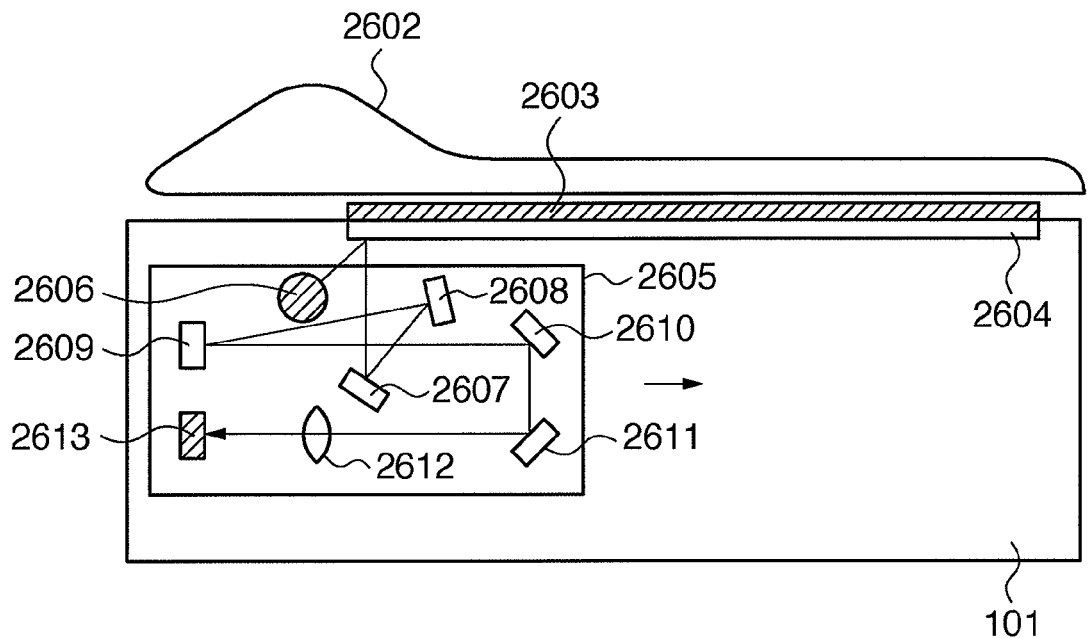
FIG. 26 is a diagram illustrating a cross-section of an image reading unit.
Figure 27:
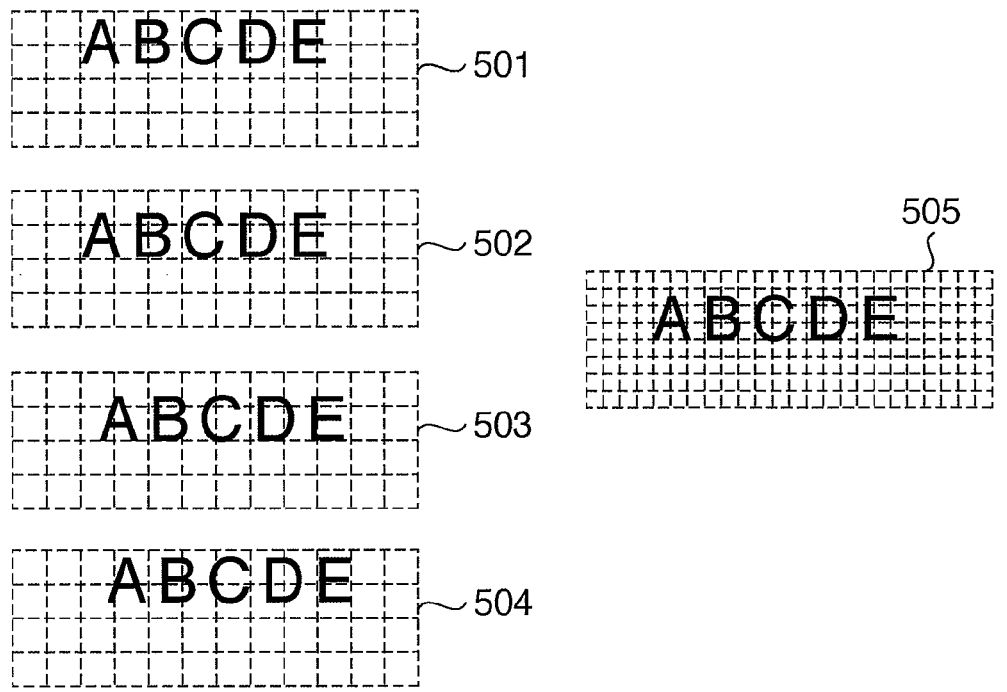
FIG. 27 is a diagram illustrating an example of super-resolution processing.

FIG. 26 illustrates the configuration of the scanner unit (also referred to as an "image reading unit") 101. As shown in FIG. 26, an automatic document feeder 2602 retains the original document, and has an ADF function, or a function for conveying an original document 2603 to a scanning position when making consecutive scans. A platen glass 2604 is a glass pane onto which the original document 2603 is placed when scanning the document from the document glass. A reading unit 2605 includes a light source 2606, a reading device (that is, an image sensor) that reads the image of the original document 2603, and so on, and scans the original document 2603 while moving in the sub scanning direction. The light source 2606 is a white light source such as a xenon tube, and irradiates white light upon the portion of the original document 2603 that is to be read. Mirrors 2607 to 2611 serve to lead the light emitted by the light source and reflected off of the original document into an image sensor 2613. The image sensor 2613 corresponds to the area sensor 10 shown in FIG. 2. A lens 2612 is a lens for gathering the reflected light representing the document image data, reflected by the mirror 2611, onto the image sensor 2613. The image sensor 2613 is an image sensor in which elements that output a formed document image as an electrical load based on, for example, the luminance thereof are arrayed in plane form. In the embodiments, the array of the elements in the image sensor 2613 has a length sufficient for one line to cover the maximum readable width of the original document, and is a grid-shaped array in which multiple such lines are arranged adjacently so that no skew occurs with respect to the pixel position. Furthermore, in the embodiments, the image sensor is fixed in the reading unit 2605 at a slight angle so that the lines thereof are not orthogonal to the sub scanning direction.

Figure 28:
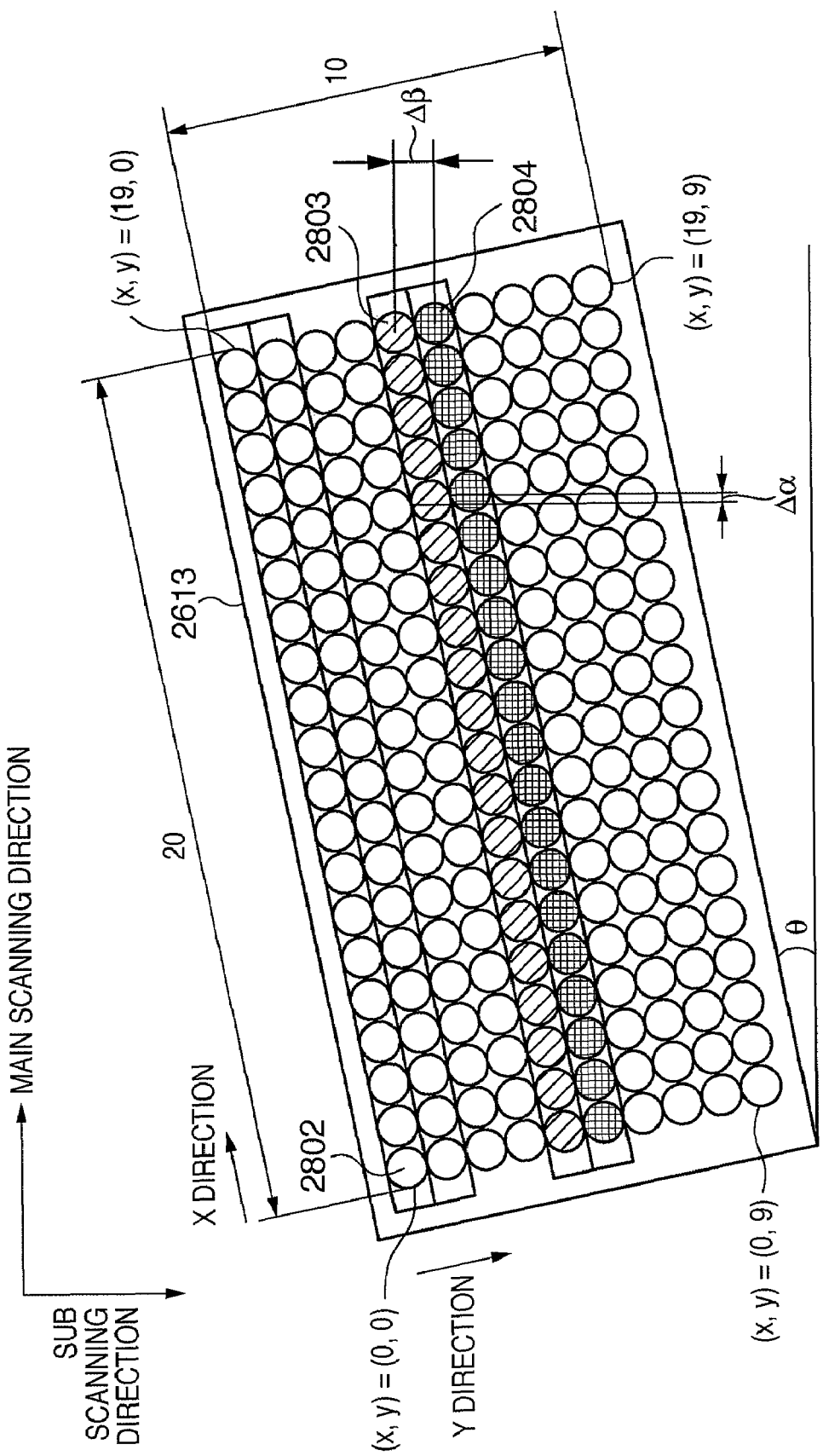
FIG. 28 is a diagram illustrating an example of the arrangement of image sensors.

FIG. 28 illustrates an example of the image sensor 2613. Although FIG. 28 illustrates a ten-line sensor rather than a three-line sensor, the sensor is as shown in FIG. 2 if, for example, three lines, or an upper line, a lower line, and an intermediate line therebetween, are used.

In the embodiments, the image sensor 2613 is an array of 20 pixels in the main scanning direction and 10 pixels in the sub scanning direction, and the image sensor 2613 composes an area sensor that extends in the direction of the lines in which the elements are arranged, and in the direction orthogonal thereto. This area sensor is installed at an angle relative to the standard installation position. The "standard installation position" refers to a position of arrangement whereby the lines are orthogonal relative to the sub scanning direction in which the image reflected from the original document moves; in normal copiers, scanners, and so on, the image sensor 2613 is fixed in the standard installation position. In such a case, the pixel rows read by each line are pixel rows that follow the main scanning line as-is. However, in the embodiments of the present invention, the image sensor 2613 is installed at an angle of θ relative to the standard installation position. In other words, while the direction of the lines is orthogonal to the sub scanning direction in the standard position, the direction of the lines and the sub scanning direction compose an angle of (90+θ) degrees according to the position shown in FIG. 28. In this case, the angle of the lines is corrected at the image data level, which is the first time that the image data has its pixel arranged in an orthogonal coordinate system.

In FIG. 28, the position of the configured image sensor 2613 takes the main scanning direction as the x direction and the sub scanning direction as the y direction, with the upper-left end of the area sensor as the origin. In other words, the coordinates of the upper-left end are (x, y)=(0, 0), whereas the coordinates of the upper-right end are (x, y)=(19, 0). Similarly, the coordinates of the lower-left end are (x, y)=(0, 9), whereas the coordinates of the lower-right end are (x, y)=(19, 9).

A line 2803 represents a single line's worth of pixel sensors that make up an area sensor 2801. To be more specific, the line 2803 is configured of 20 pixel sensors that follow the main scanning direction. In other words, the line 2803 is configured of the pixels sensors located at coordinates (0, 4), (1, 4), (2, 4), and so on up to (19, 4). Note that in the following descriptions, the multiple pixels sensors shown in the line 2803 shall be referred to as "reading line sensors 2803". In the same manner, a line 2804 is configured of pixel sensors located at coordinates (0, 5), (1, 5), (2, 5), and so on up to (19, 5), and shall be referred to as "reading line sensors 2804" in the following descriptions.

In the embodiments, the reading unit 2605, including the image sensor 2613, that is installed in the scanner 101, is driven in the sub scanning direction indicated in FIG. 28, thereby reading an image of the original document placed on the document glass 2604. In other words, the reading line sensors 2803 and 2804, which are collections of image sensors, perform reading operations by acting as individual independent line sensors.

Next, the composition of the image data read by the reading line sensors 2803 and the reading line sensors 2804 shall be described. The present description uses the letter "A" of the English alphabet, written at a size that covers the entirety of a sheet of paper, as an example of the image that is read.

The original document image is read by the image sensor 2613, but because the image sensor 2613 (that is, each line sensor) is sloped at an angle of θ, image data in which each line is also sloped at an angle of θ is obtained. The read image data is then stored as-is in a storage medium such as a memory.

Figure 29A:
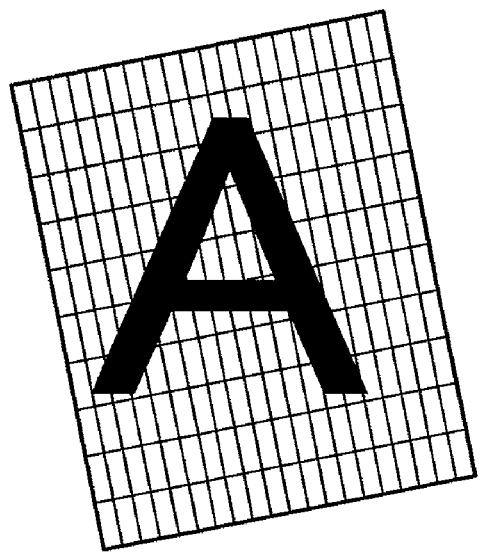
FIGS. 29A and 29B are diagrams illustrating examples of imaging using the image sensors shown in FIG. 28 and low-resolution image data read thereby, respectively.
Figure 29B:
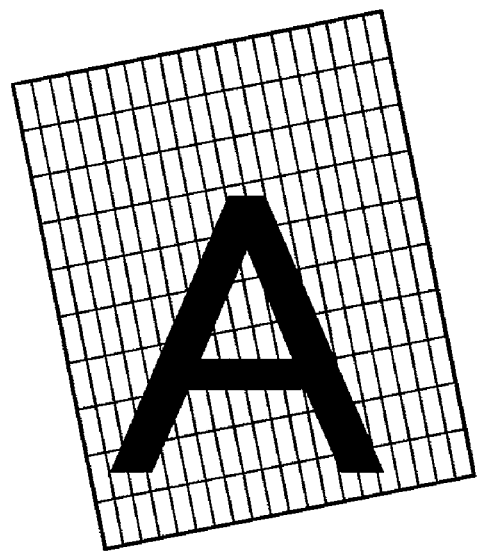

The image data detected by each line sensor in the image sensor 2613 and read is data such as that shown in FIGS. 29A and 29B, and both are read as image data sloped at an angle of θ. FIGS. 29A and 29B are examples of image data read by the two different line sensors 2803 and 2804, respectively. As shown in FIG. 28, the reading line sensors 2803 and reading line sensors 2804 are physically shifted a single pixels' worth in the sub scanning direction. Therefore, there is a phase shift (or a position shift) in the horizontal and vertical directions between the pixel sensors that make up the reading line sensors 2803 and the pixel sensors that make up the reading line sensors 2804. For example, the pixel sensor in the reading line sensors 2803 located at coordinates (x, y)=(15, 4) and the pixel sensor in the reading line sensors 2804 located at coordinates (x, y)=(15, 5) are shifted, location-wise, by an amount equivalent to one pixel in the y-axis direction. This shift causes a shift of $\Delta\beta$ (pixel)<1 (pixel) in the sub scanning direction.

Meanwhile, the location in the x-axis direction is the same x=15. However, due to the slope at an angle of θ, a phase shift of an extremely small amount $\Delta\alpha$ exists at the subpixel level, with respect to the horizontal direction, or the main scanning direction prior to sloping the entire area sensor. In other words, even if certain elements in multiple line sensors are located at the same position in the x-axis direction, sloping the image sensor 2613 causes an extremely small level of phase shift, dependent on the angle of the slope, to occur in the main scanning direction and sub scanning direction.

Therefore, the pieces of image data read by multiple adjacent line sensors defined within the image sensor 2613 each have the same resolution as one another, but have a phase shift of less than one pixels' worth between them. More specifically, the read image data shown in FIG. 29A and the read image data shown in FIG. 29B have a phase shift of not only $\Delta\beta$ in the sub scanning direction, but also $\Delta\alpha$ in the main scanning direction.

In the above descriptions, it is assumed that there are two sets of reading line sensors (that is, the reading line sensors 2803 and 2804), but the embodiments are not limited thereto. Three or more reading line sensors may be provided by increasing the number of pixel sensors, which make up the image sensor 2613, in the x-axis direction. In other words, the maximum number of reading line sensors is equivalent to the number of elements, which make up the image sensor 2613, arranged in the x-axis direction. The number of sets of reading line sensors is equivalent to the number of pieces of image data obtained by a single reading operation. In other words, if 30 lines' worth of reading line sensors are provided within the image sensor 2613, 30 images with phases shifted from one another can be obtained through a single reading operation. Furthermore, by sloping the image sensor 2613, image data in which the shift in the main scanning direction between images read by adjacent line sensors is less than one pixels' worth can be obtained, with the number of pieces of such image data obtained from a single scan of the original document being equal to the number of lines.

As described thus far, because the image sensor 2613 is sloped and the rows of elements within the image sensor 2613 are provided with an interval therebetween, image data of multiple images in which the phase is shifted with respect to the main scanning direction and sub scanning direction on a line-by-line basis is obtained. The processing paths by which these multiple images are generated are called "channels". If the phase shift between channels is at the subpixel level, those pieces of image data can be used for super-resolution processing to obtain a high-resolution image. Furthermore, it is possible to set the phase shift to the subpixel level by adjusting the interval between and angle of the sensors. Ultimately, even if the phase shift exceeds a single pixel, the image data can be used in super-resolution processing by subtracting shift at the pixel level and restoring the subpixel shift, with the exception of phase shift in the ends of the lines.

In FIG. 28, the image sensor 2613 reads images using two lines, thereby outputting two pieces of image data with their respective phases shifted from each other through a single scan. However, this example is for explanatory purposes only; if the number of lines results in an amount of phase shift within one pixel's worth, such as, for example, n lines, as shown in FIG. 4, as many as n pieces of low-resolution image data with shifted phases can be output.

<Super-Resolution Processing>

Figure 5:
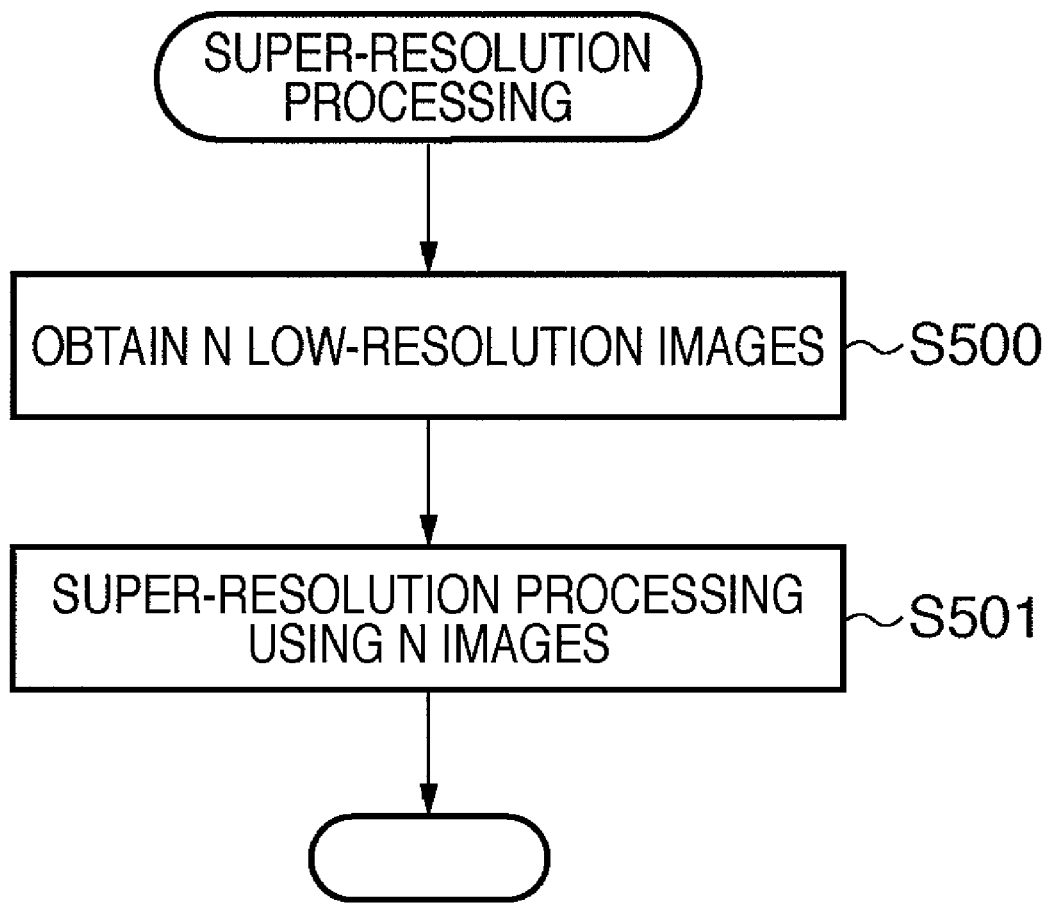
FIG. 5 is a flowchart illustrating super-resolution processing according to an embodiment of the present invention.

Next, the super-resolution processing performed by the super-resolution processing unit shall be described using the schematic diagram in FIG. 4 and the flowchart in FIG. 5. Super-resolution processing itself is a known technique and thus only an outline thereof shall be given here. As shown in FIG. 4, the super-resolution processing unit performs the super-resolution processing using multiple pieces of low-resolution image data having different phases. Multiple pieces of low-resolution image data are used in the super-resolution processing, and the greater the number of pieces of low-resolution image data used, the higher the accuracy of pixel extraction in the generated high-resolution image data.

This is because, as indicated by the hatched portion 401 in FIG. 4, the greater the number of pieces of low-resolution image data, the greater the amount of data for each pixel in the resulting high-resolution image data. With respect to the processing flow, first, a set number of pieces of low-resolution image data is obtained from the area sensor 10 (S500), and the super-resolution processing is performed using that low-resolution image data (S501). Note that the image data is handled as, for example, a data file, a single one of which normally corresponds to a single image; thus, in the embodiments, the image data is described as being handled in "pieces".

In the embodiments, the multiple low-resolution images are obtained using the area sensor 10 having an array as shown in FIG. 28. However, several other methods for obtaining multiple low-resolutions can also be considered. For example, the obtained pixel information can be handled as separate lines, and different pixels can be selected using an array of pixels (for example, a Bayer array or the like). Furthermore, multiple pixels can be extracted as a single piece of image data. Such a method also allows the stable obtainment of low-resolution images with differing phase information.

The super-resolution processing unit 11 performs the super-resolution processing based on a pre-set number of pieces of low-resolution image data, thereby generating the high-resolution image data. If the input low-resolution images are pieces of image data with differing phases, and the number of input images is high, the subpixel extraction accuracy in the generated high-resolution image data can be improved, and image data of a higher resolution and with a higher MTF (resolution) can be generated. FIG. 6 is a table in which the various image processing apparatus described in the embodiments are shown in association with the type of scanner installed therein.

The super-resolution processing unit 11 accepts super-resolution processing parameters set by the super-resolution parameter setting unit 12, or more specifically, the number of images to be used in the super-resolution processing, and performs the super-resolution processing. The super-resolution parameter setting unit 12 reads out the parameters from a super-resolution parameter storage unit 13 that stores the number of images necessary for the super-resolution processing. Note that there is also a data flow from the area sensor 10 to the image processing unit 14. This system, however, is an image processing flow in which super-resolution processing is not performed, and is used to measure the initial MTF.

FIG. 3 is a diagram illustrating the content of the ROM and the RAM of the image processing apparatus according to the embodiments. Programs such as a super-resolution processing program 200, an image reading processing program 201, a resolution measurement processing program 202, and a communication processing program 203, as well as data and the like, are stored in the ROM 104. A work area 204 is secured within the RAM 103, in addition to an image number 205 and target MTF 206, the determination procedure for which shall be mentioned later. These parameters are in a relationship in which super-resolution processing using the number of pieces of low-resolution image data specified by the image number 205 is necessary in order to attain the target MTF 206, and the combinations of these values are called an MTF properties table 207. The RAM 103 also contains identification information 208 indicating the type of the scanner unit.

Figure 30:
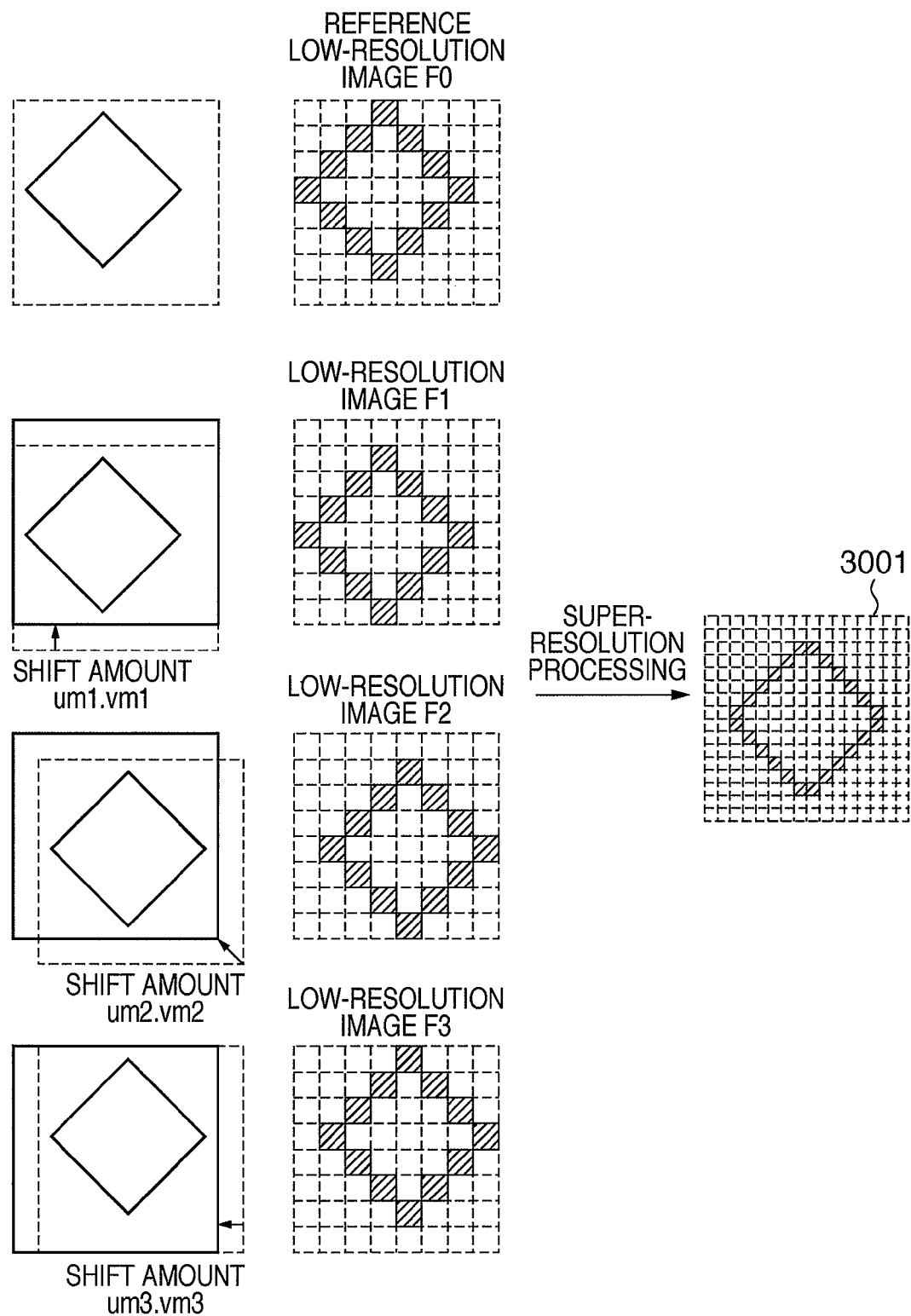
FIG. 30 is a diagram illustrating an example of super-resolution processing.

An example of the super-resolution processing shall be described next with reference to FIGS. 30 and 31. Here, low-resolution image data is processed, and FIG. 30 shows the low-resolution image data used in the super-resolution processing as well as the high-resolution image data resulting from the super-resolution processing. The images F0 to F3 in the left side of FIG. 30 are low-resolution image data. It is assumed that this low-resolution image data has already been obtained.

The angle θ at which the image sensor 2613 is sloped is held as a value unique to the device in which it is installed in a storage region within that multi-function peripheral. In the super-resolution processing in the embodiments, affine transformation is carried out using this angle information; the obtained sloped image data is rotated, correcting the slope of the image data by making compensations to reduce the slope in the scanning directions of the image data.

Taking the pre-transformation coordinates as (X, Y), the post-transformation coordinates as (X', Y'), and the rotation angle (in the embodiments, the angle at which the area sensor is sloped) as θ, image data, whose slope has been corrected through an affine transformation such as that shown in Equation 1, can be obtained. X, Y indicate the pre-transformation pixel coordinates, whereas X', Y' indicate the post-transformation coordinates.

$$[X', Y', 1] = [X, Y, 1] \begin{bmatrix} \cos\theta & \sin\theta & 0 \\ -\sin\theta & \cos\theta & 0 \\ 0 & 0 & 1 \end{bmatrix} \quad \text{Equation 1}$$

The image data obtained through the stated affine transformation is low-resolution image data whose slope has been corrected. Note that the method for correcting the slope is not limited to an affine transformation, and any method may be used as long as that method can correct the slope of the image data.

Next, the super-resolution processing is executed using the multiple pieces of low-resolution image data whose slope has been corrected.

FIG. 30 indicates the document, reference low-resolution image data F0, and other low-resolution image data (called "target low-resolution image data") F1 to F3, obtained by reading the document with the area sensor. The dotted quadrangle surrounding the document indicates a region resulting from the reference low-resolution image data F0 being read by the area sensor, whereas the solid quadrangles indicate regions resulting from the target low-resolution image data F1 to F3 being read by the area sensor.

In the embodiments, each target low-resolution image is shown as being shifted by a single pixel for the sake of simplicity, as shown in FIG. 30; however, in actuality, a phase shift of less than one pixel in the main scanning direction and sub scanning direction arises in the reading performed by the area sensor. A high-resolution image can be created using this extremely small shift.

Of the pixels that make up the generated high-resolution image data (called "generated pixels" hereinafter), there are some pixels that are present in neither the reference low-resolution image nor the target low-resolution images.

For such pixels, the resolution is increased while performing synthesis, by performing a predetermined interpolation process using pixel data expressing the values of the pixels surrounding those generated pixels. The bilinear method, bicubic method, nearest neighbor method, and so on can be used in the interpolation process. An example of this is shown in FIG. 31.

For example, when the bilinear method is used in the interpolation process, a nearest pixel 1802, which is closest to the location of a generated pixel 1801, is first extracted from the reference low-resolution image and the target low-resolution image data. Then, the four pixels surrounding the location of the generated pixel are determined as surrounding pixels 1802 to 1805, from the target low-resolution images in FIG. 31, values obtained by adding a predetermined weighting to the data values of the surrounding pixels are averaged, and the generated pixel data value is obtained through the following equation.

$$f(x, y)=[|x1-x|\{|y1-y|f(x0, y0)+|y-y0|f(x0, y1)\}+|x-x0|\{|y1-y|f(x1, y0)+|y-y0|f(x1, y1)\}]/|x1-x0||y1-y0|$$

Repeating the above processing for each generated pixel location makes it possible to obtain, for example, a super-resolution image 3001 with 2× resolution, as shown in FIG. 30. Note that the resolution is not limited to 2×, and may be any of various multiples. Furthermore, a higher-resolution super-resolution image can be obtained by using more data values from the multiple low-resolution images in the interpolation processing.

Furthermore, the super-resolution processing can be performed at the block level, for blocks that make up the image. Finally, the determination of the number of pieces of low-resolution image data described above may also be performed at the block level.

Next, specific examples of processing performed in the present invention using the image processing apparatus shall be described.

(First Embodiment)

An image processing system that corrects variances in the MTF and outputs stable scan data by setting, when shipping a scanner, a number of images to undergo super-resolution processing, which is a first embodiment of the present invention, shall be described hereinafter. This image processing system includes an information processing apparatus such as a computer and an image processing apparatus such as a scanner, and it is preferable for the two to be connected to each other. This is to make it possible for information to be collected from and sent to the scanner online, but the present embodiment can be realized as long as information can be input/output to/from the apparatuses, even if the apparatuses are not connected to each other and are offline.

<Extraction of MTF Properties Based On Scanner Type>

Various reading devices are used in image processing apparatuses such as digital multi-function peripherals (MFPs). Here, in order to make it possible to identify the variance properties of the reading resolution, the MTF variance characteristics are extracted for scanners of the same type.

First, a target MTF value is set. This target value is, for example, input into the operation unit 106, and saved in the target MTF region 206. Here, the target MTF value of a scanner unit (scanner type 100) installed in a multi-function peripheral (MFP)-A is set to 60 (%).

Figure 7:
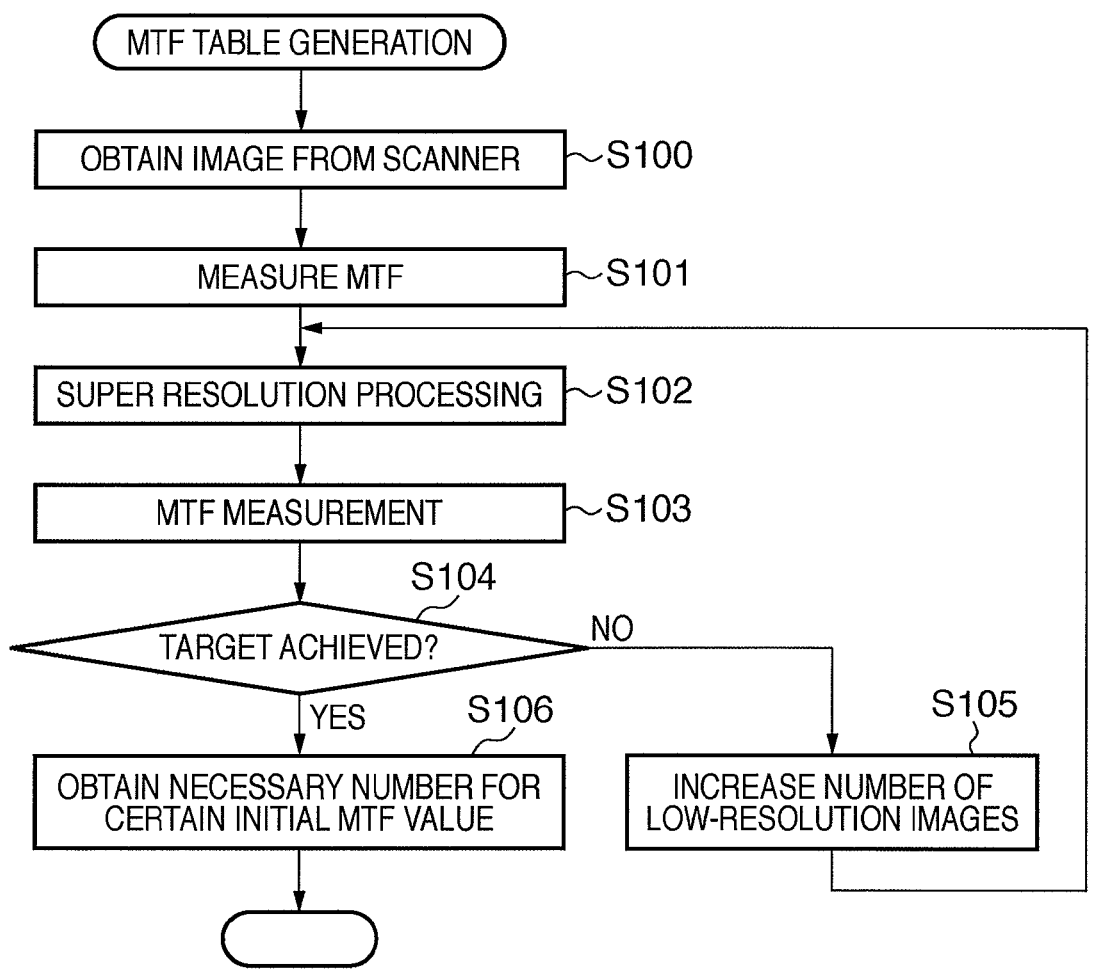
FIG. 7 is a flowchart illustrating a process for generating an MTF properties table according to an embodiment of the present invention.

Next, a procedure for creating an MTF properties table for the scanner type 100 shall be described using the flowchart in FIG. 7. This procedure is executed by an operator or the like using the image processing apparatus and an MTF measuring device.

First, in order to measure the variance in the initial MTF of the scanner type 100, the MTF of the scanner type 100 when no super-resolution processing is performed, or in other words, the initial MTF, is measured. Specifically, using the image processing apparatus that utilizes the scanner type 100, the scanner unit shown in FIG. 2 loads an MTF measurement chart using a system in which super-resolution processing is not performed, or in other words, skipping the super-resolution processing, and generates image data (S100). The MTF value of the scanner type 100 is then measured using the generated image data and the MTF measurement device (S101). The MTF value of the scanner type 100 in its initial state is found through the procedure performed thus far. The initial MTF value is registered as the initial MTF value of that scanner unit in the MTF properties table. The registration can be carried out through, for example a generic computer. The scanner can specify whether or not to perform super-resolution processing, and processing is performed based on that specification. This specification is only valid at the time of manufacture, but the configuration may be such that, for example, the specification is invalid in the shipped product and the super-resolution processing is always performed.

Figure 8:
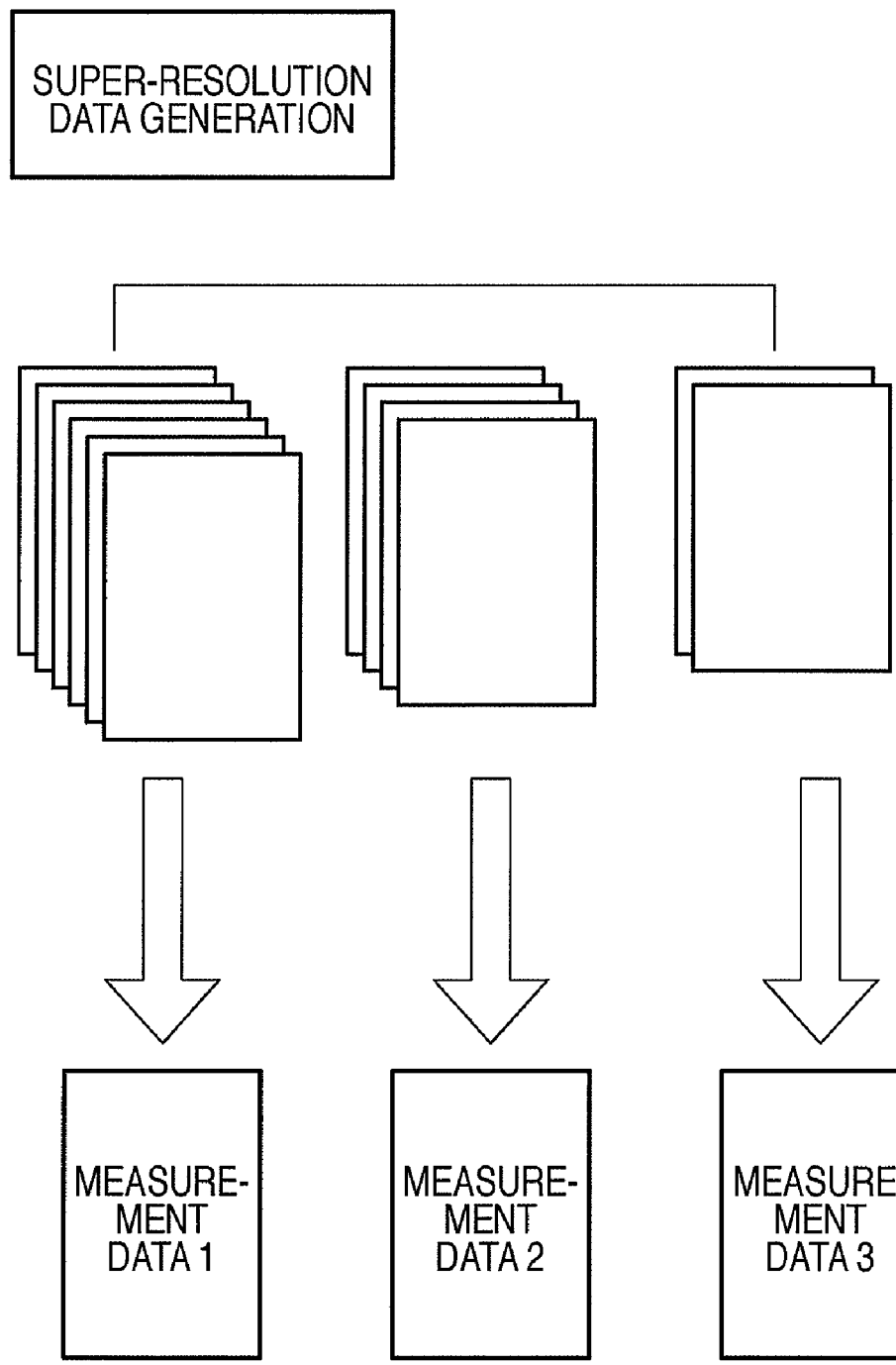
FIG. 8 is a schematic diagram illustrating a process for generating super-resolution image data according to an embodiment of the present invention.

Next, the super-resolution processing is performed, and the necessary number of low-resolution images required for the super-resolution processing until the target MTF is reached is acquired. To be more specific, the super-resolution processing unit 11 performs super-resolution processing using the image data output from the area sensor 10 as the low-resolution image data (S102). Furthermore, the number of images inputted for the super-resolution processing is increased, and whether or not the generated image data has reached the target MTF is measured. Thus, initially, the processing is started using two pieces of super-resolution image data. However, when performing the super-resolution processing, the super-resolution processing may be performed on each piece of low-resolution image data used in the super-resolution processing, and the super-resolution image may be generated in accordance with the number of multiple images used at once, as a method for learning the MTF properties of the scanner type 100, as shown in FIG. 8. The MTF of the high-resolution image data generated in such a manner is measured using the MTF measurement system (S103). It is then determined whether or not the measured value has reached the target MTF (S104). If the result of the determination indicates that the target MTF has been reached, the number of pieces of low-resolution image data used to create that high-resolution image data is the number of pieces of low-resolution image data necessary in the super-resolution processing for setting the resolution of the scanner unit to the target resolution. As a result, the number of low-resolution images necessary to reach the target MTF for the scanner type 100 is calculated (S106). This number is saved in association with the initial MTF as the number of images in the MTF properties table.

Of course this number is not a number that is applicable to all scanners of the scanner type 100, and thus it is necessary to determine this number for each individual scanner of the scanner type 100 in order to resolve individual differences. Accordingly, the necessary number of images for a super-resolution is acquired for multiple scanner types 100 as well.

Meanwhile, if the target value has not been reached, the number of pieces of low-resolution image data is increased further (S105), and the super-resolution processing is carried out once again. At this time, the number of pieces of low-resolution image data by which the number is to be increased can be estimated based on the difference between the measured MTF value and the target MTF value, and the number can then be increased by that estimated number.

As a result of the above processing, a table of the number of low-resolution image necessary in the super-resolution processing for the initial MTF and the target MTF can be generated, the table being based on the variance properties of the scanner type 100.

Figure 9:
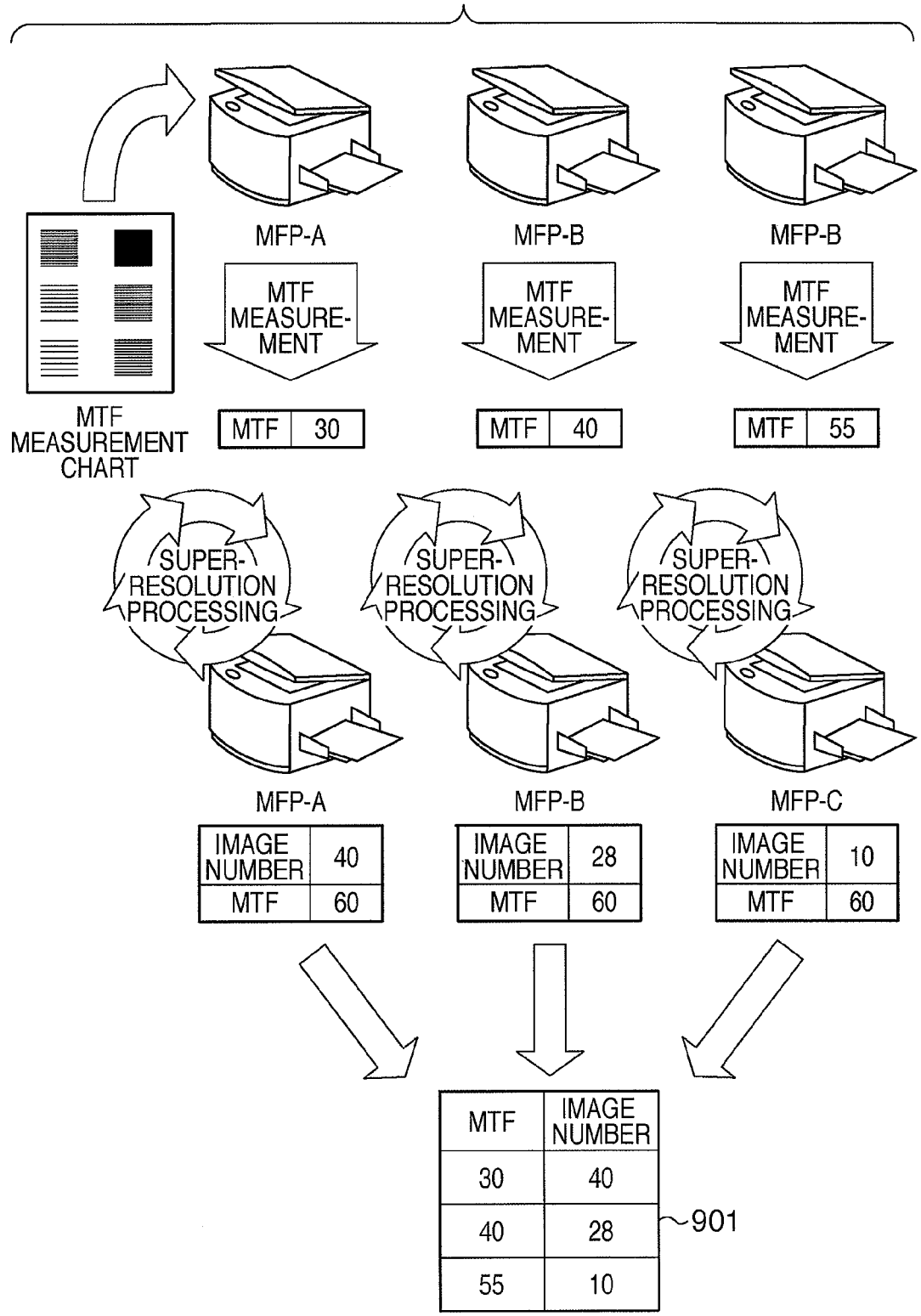
FIG. 9 is a schematic diagram illustrating a procedure leading up to the generation of an MTF properties table according to an embodiment of the present invention.

FIG. 9 is a schematic diagram expressing the flow of the above descriptions. MFP-A, MFP-B, and MFP-C are image processing apparatuses that are each equipped with a scanner of the scanner type 100. The initial MTF value of the MFP-A is 30, the initial MTF value of the MFP-B is 40, and the initial MTF value of the MFP-C is 55.

Furthermore, as a result of performing super-resolution processing to reach a target MTF of 60, the necessary number of images in the MFP-A is 40, the necessary number of images in the MFP-B is 28, and the necessary number of images in the MFP-C is 10. As a result, an MTF properties table 901 is created for the scanner type 100, as shown in FIG. 9. This MTF properties table is copied into a memory (for example, a ROM) in the scanner unit of the scanner type 100, and the scanner unit acquires therefrom the number of images corresponding to the initial MTF of the scanner unit, which has been measured separately, and performs the super-resolution processing using that number of pieces of low-resolution image data.

<Procedure for Setting Super-Resolution Parameters in Shipping Process>

Figure 10:
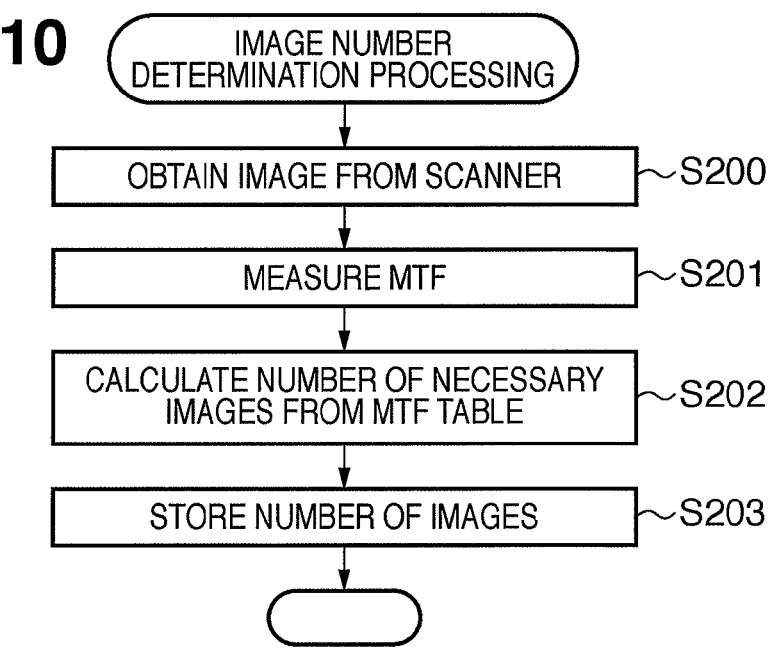
FIG. 10 is a flowchart illustrating super-resolution parameter settings at the shipping stage according to the first embodiment of the present invention.
Figure 11:
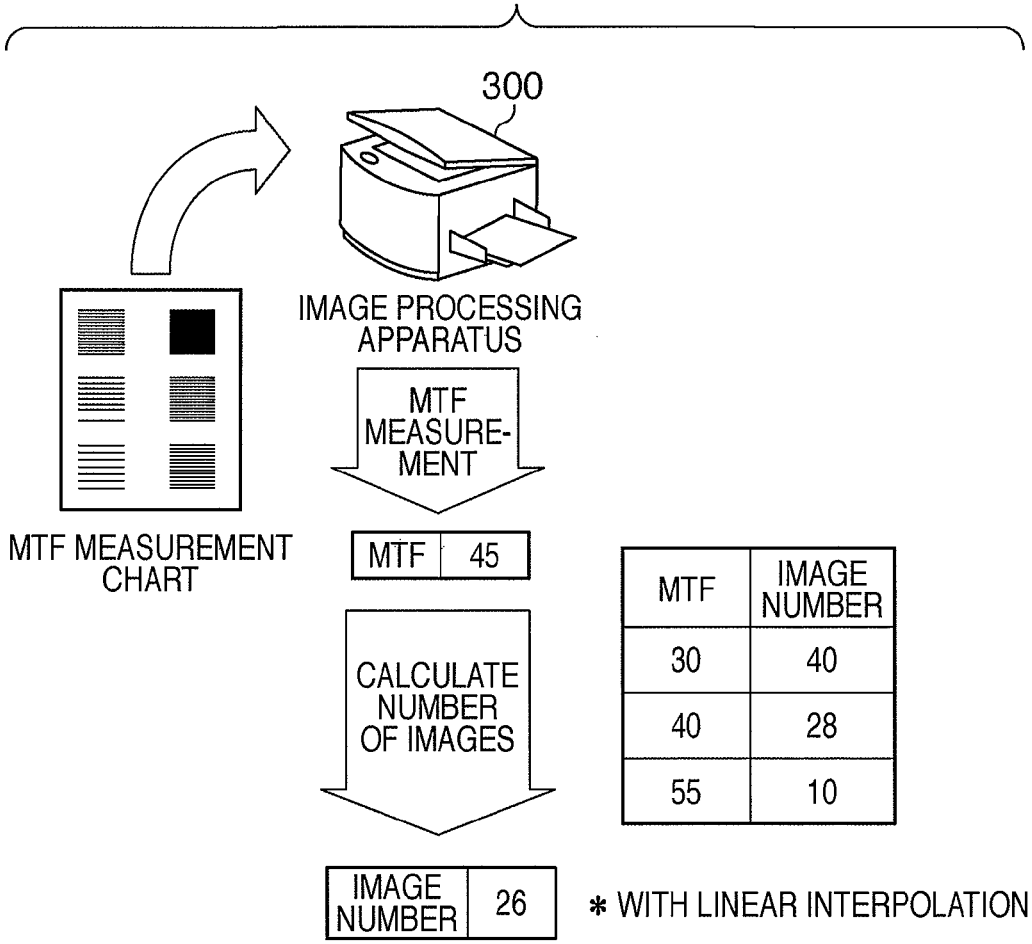
FIG. 11 is a diagram schematically illustrating super-resolution parameter settings at the shipping stage according to the first embodiment of the present invention.

Next, a procedure carried out when shipping an image processing apparatus that uses the scanner type 100 shall be described using the flowchart in FIG. 10 and the schematic diagram in FIG. 11. In the shipping process, the MTF properties table 207 created through the procedure shown in FIG. 7 is stored in the image processing apparatus, as shown in FIG. 3. In the present example, it is assumed that the MTF properties table 901 is stored. The MTF of the scanner unit in the image processing apparatus that uses the scanner type 100 is also measured. To be more specific, the MTF of the scanner in its initial state is measured using the MTF measurement chart, in the same manner as when extracting the MTF properties (S200>S201).

Here, for example, the MTF value in an image processing apparatus 300 provided with the scanner type 100 is 45. In this case, the necessary number of images for use in the super-resolution processing corresponding to an MTF value of 45 is obtained from the MTF properties table 901 of the scanner type 100 generated through the procedure shown in FIG. 7. To be more specific, the initial MTF value in the MTF properties table 901 shown in FIG. 9 is referred to, and the initial MTF value closest to the initial MTF of the scanner unit being measured is retrieved from the table 901. If the exact same MTF value is present, the number of images corresponding to that MTF value is employed as the number of images necessary for the correction. If, however, there is no matching value, the number of images registered in the table 901 corresponding to the MTF before and after that value undergoes linear interpolation, and the number of images is calculated. Note that when there is no value in the vicinity, the linear interpolation is performed using the number of images corresponding to the closest value and the next-closest value.

Through the above procedure, the number of images necessary in the super-resolution processing performed by the image processing apparatus 300 for achieving the target MTF is calculated (or determined) (S202). The value determined here is stored in the image number storage region 205 in the non-volatile RAM as reading parameters of the image processing apparatus 300 (S203).

In this example, the overall process shown in FIG. 10 is executed by an information processing apparatus such as a computer, and the number of images obtained is registered in the image processing apparatus. However, for example, the initial MTF value measured in step S201 may be registered in the image processing apparatus, and the image processing apparatus may execute steps S202 and S203 and determine the number of images.

<MTF Correction Processing in Environment Used by User>

Figure 12:
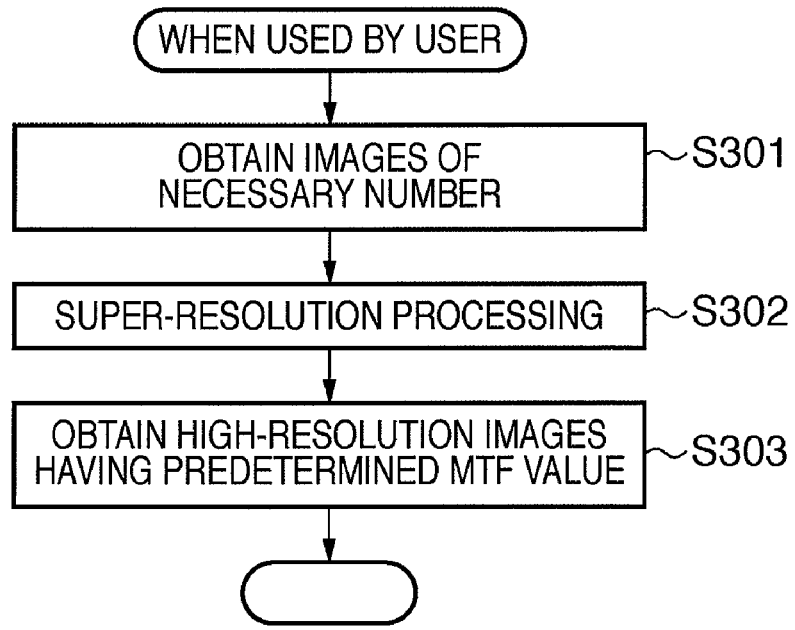
FIG. 12 is a flowchart illustrating MTF correction processing during use by a user according to the first embodiment of the present invention.
Figure 13:
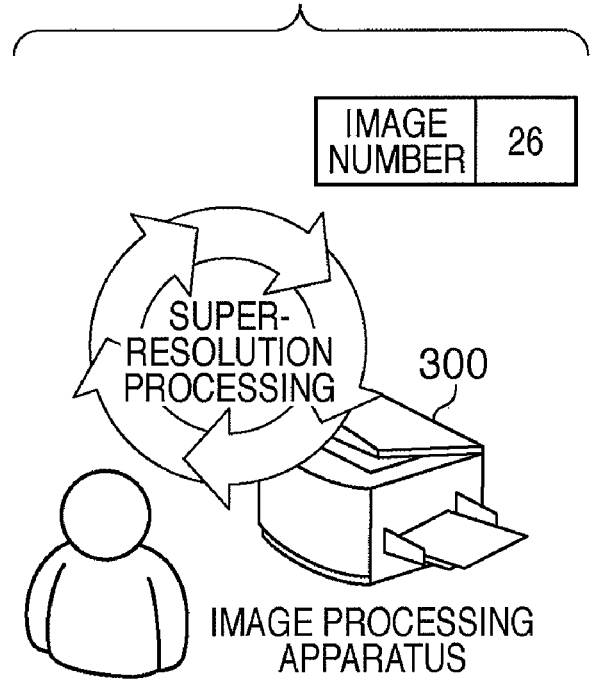
FIG. 13 is a diagram schematically illustrating operations performed during use by a user according to the first embodiment of the present invention.

Finally, MTF correction processing in the case where a user actually uses the image processing apparatus shall be described using the block diagram of the scanner unit shown in FIG. 2, the flowchart shown in FIG. 12, and the schematic diagram shown in FIG. 13. The flow in FIG. 12 is executed by the image processing apparatus. The reading process is carried out when an operator specifies a function such as copying or faxing and the reading process is launched, and the super-resolution processing unit 11 shown in FIG. 2 is performed.

In this super-resolution processing, the number of images stored in the image number storage region 205 (a value of, for example, 26) during the shipping process, described above, is set in the super-resolution processing unit 12 by the super-resolution parameter setting unit 13 (S301), and the super-resolution processing is then performed (S302). As a result, the image data generated by the super-resolution processing unit 13 is image data that fulfils the MTF set as the target (S303), and that image data is passed to the image processing unit 14.

Note that in the above embodiment, no mention is made of adjustments made on multiple channels (for example, the various color components in a color scanner plane), but the same method of processing can be performed for color scanning as well. However, the target MTF value and number of images necessary in super-resolution processing are necessary for each scanning channel, such as RGB, K, and so on.

The above configuration and procedures make it possible to eliminate individual differences in resolution between scanner units and to manufacture products that uniformly achieve a target resolution. For this reason, the manufacturing yield of scanners can be improved.

(Second Embodiment)

Next, a method aligning target reading MTF values within a group, thereby making the reading accuracies uniform within the group, shall be described as a second embodiment of the present invention. In the present embodiment, the processing performed up until the shipping process is the same as that in the first embodiment, and thus detailed descriptions thereof shall be omitted.

<Procedure for Setting Super-Resolution Parameters in Shipping Process>

Figure 14:
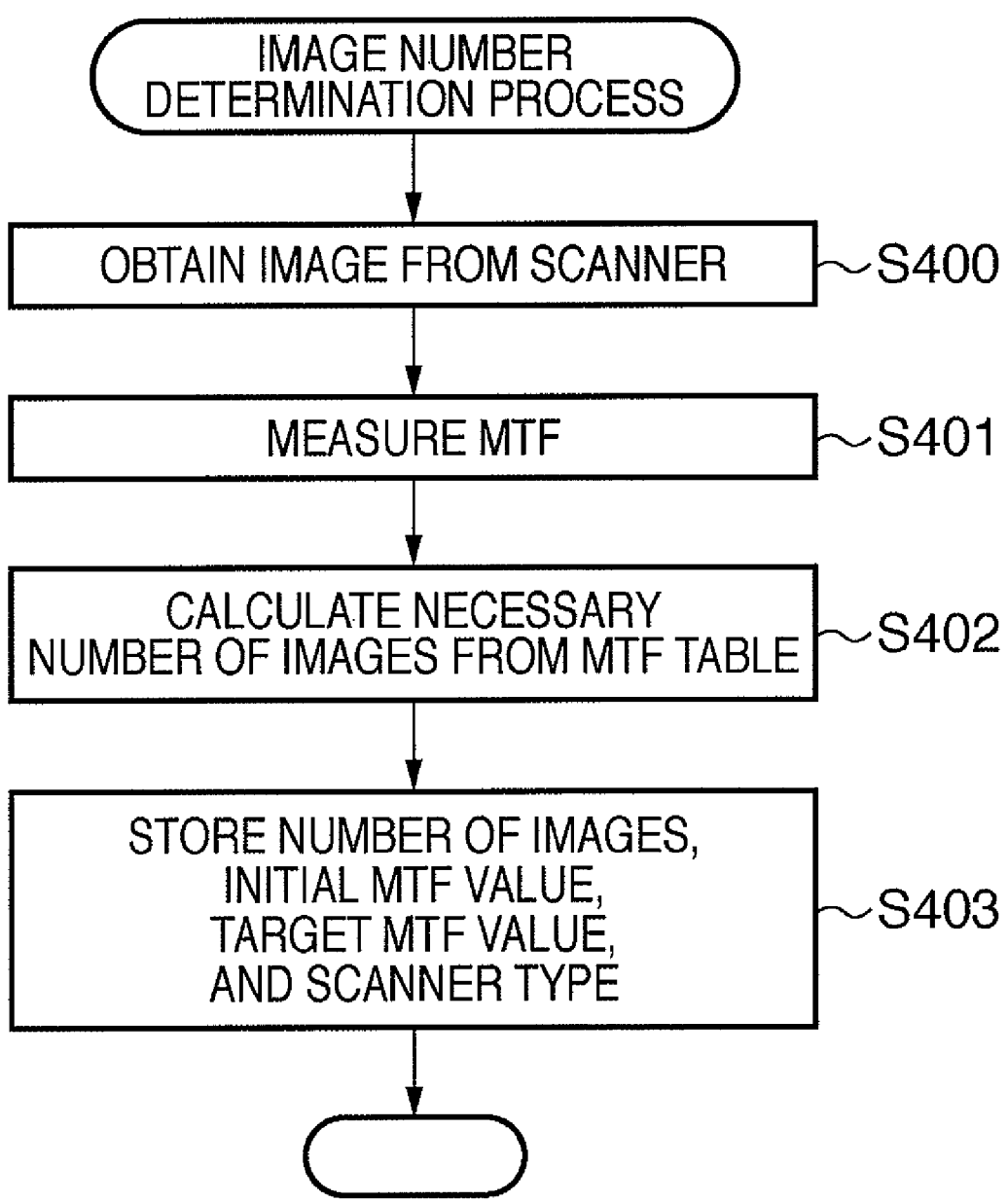
FIG. 14 is a flowchart illustrating a procedure for making super-resolution parameter settings at the shipping stage according to the second embodiment of the present invention.
Figure 15:
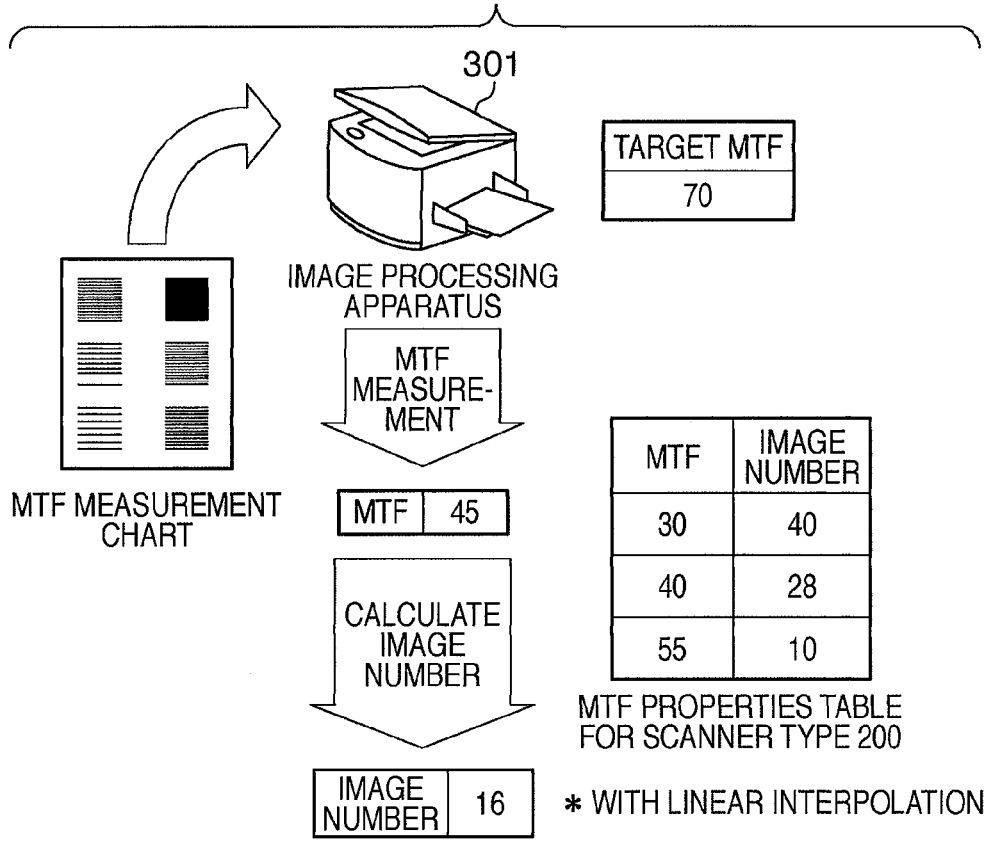
FIG. 15 is a diagram schematically illustrating super-resolution parameter settings at the shipping stage according to the second embodiment of the present invention.

The parameter setting procedure in the shipping process shall be described using the flowchart in FIG. 14 and the schematic diagram in FIG. 15. In the shipping process, an image processing apparatus 301 acquires images using an MTF measurement chart (S400), and measures the MTF using an MTF measurement device (S401). As a result, an initial reading MTF value (of, for example, 50) is obtained. Then, the necessary number of pieces of low-resolution image data with respect to the initial reading MTF value is calculated based on an MTF properties table for a scanner (in this example, of the scanner type 200) serving as a reading device and installed in the image processing apparatus 301. A result of, for example, 16 pieces is then obtained.

The following parameters are stored in a non-volatile RAM within the image processing apparatus 301 as reading parameters (S403).

Scanner type, indicating the type of the scanner: 200
initial MTF value: 50
target MTF value: 70
number of images corresponding to target MTF value: 16

Of course, these specific values are exemplary, and parameters suitable for the capabilities of the scanner, the target MTF, and so on should be stored.

<MTF Adjustment Method Within Group>

Figure 16:
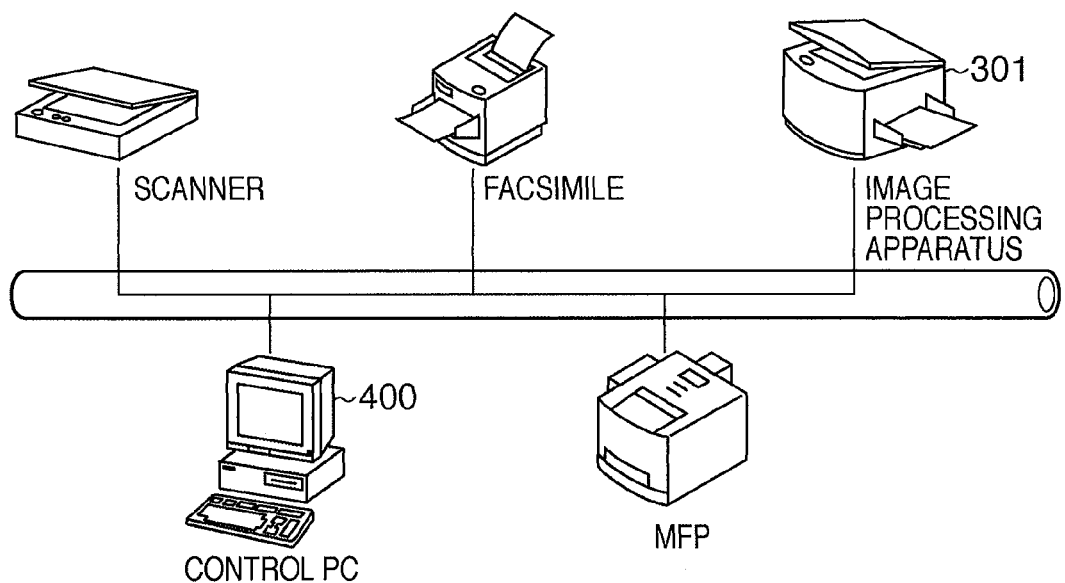
FIG. 16 is a diagram illustrating a system configuration according to the second embodiment of the present invention.
Figure 17:
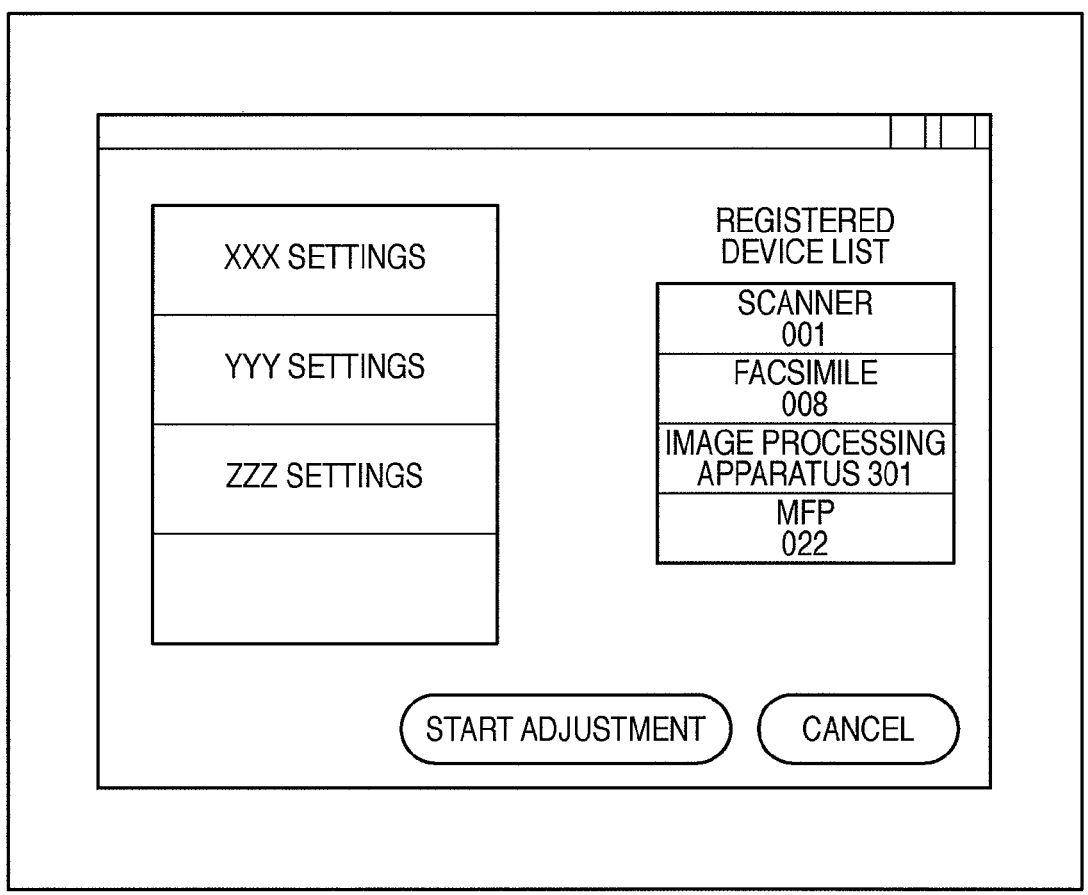
FIG. 17 is a diagram illustrating the GUI of an MTF adjustment application according to the second embodiment of the present invention.
Figure 18:
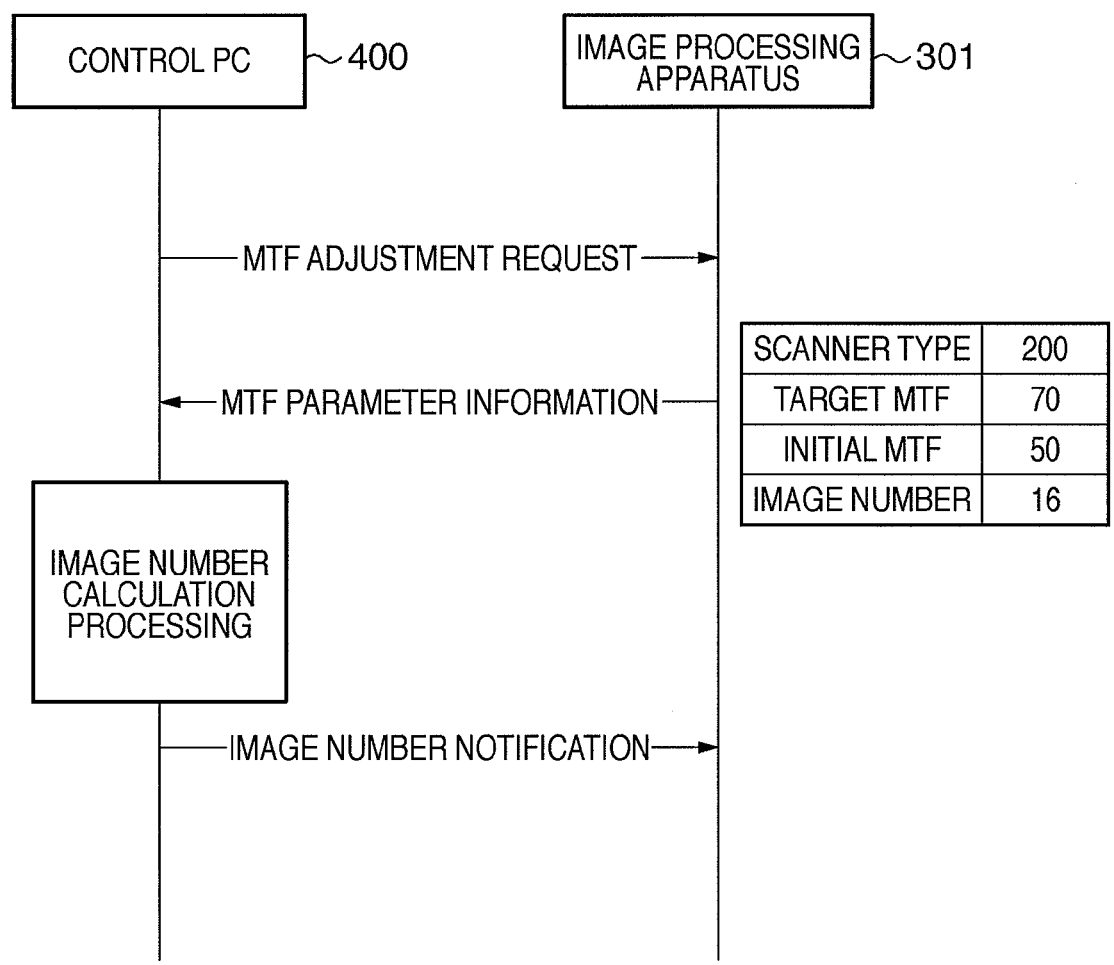
FIG. 18 is a diagram illustrating a sequence of MTF adjustment according to the second embodiment of the present invention.

Next, a method for adjusting the MTF within a group shall be described. The multiple MFPs, scanner device, and control PC 400 described in the present embodiment are assumed to be configured as shown in FIG. 16. In other words, the MFP 301 and so on that make up the group are connected to the control PC 400 over a network. In the present embodiment, an application installed in the control PC 400 is used for the MTF adjustment. To be more specific, an operator launches an MTF adjustment application in the control PC 400, and executes the adjustment. Hereinafter, the procedure for adjusting the MTF shall be described in order.

First, the user registers the group for which MTF adjustment is to be performed in the control PC 400 in advance. The MTF adjustment is started by the user performing an MTF adjustment start operation through the control PC 400. Hereinafter, this shall be described in detail using the MTF properties table in FIG. 15, the sequence chart in FIG. 18, and the flowcharts in FIGS. 19 and 20.

Figure 19:
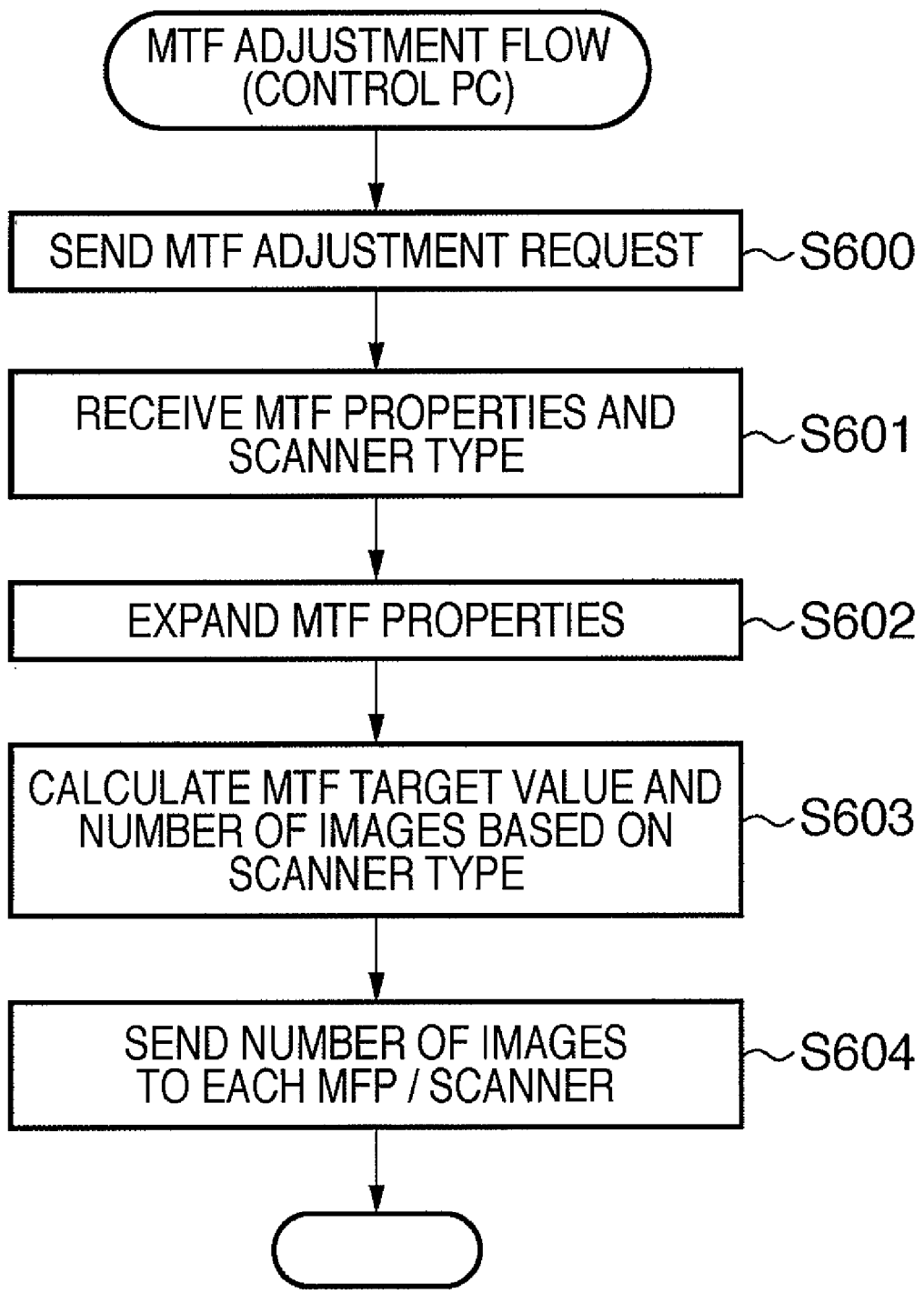
FIG. 19 is a flowchart illustrating MTF adjustment by a control PC according to the second embodiment of the present invention.
Figures 20, 21:
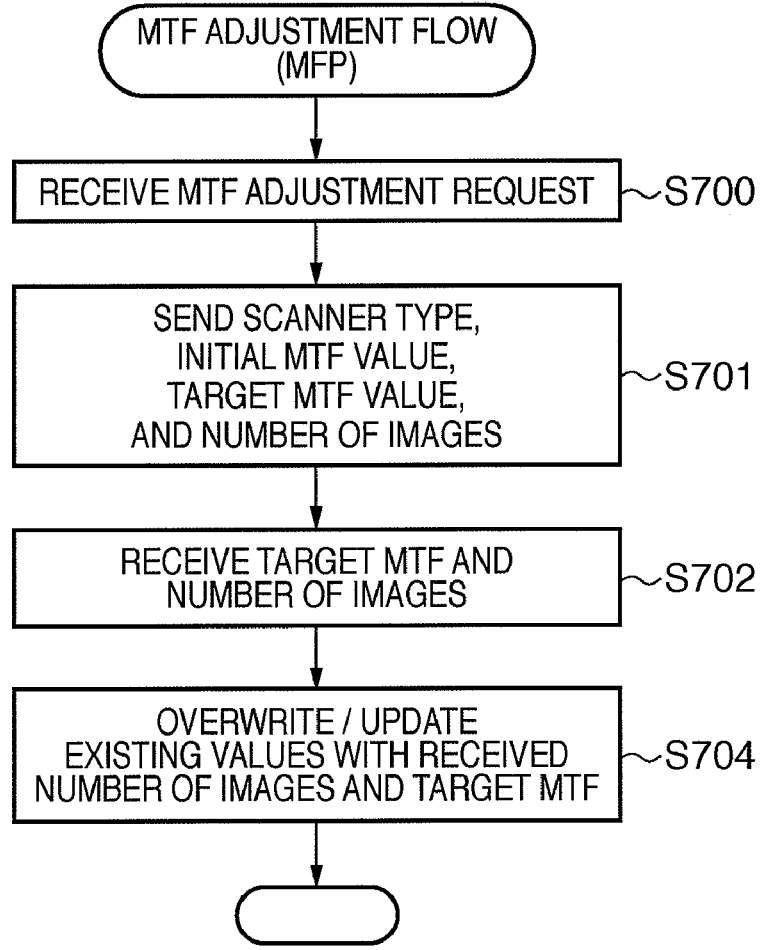
FIG. 20 is a flowchart illustrating MTF adjustment by an image processing apparatus according to the second embodiment of the present invention.
FIG. 21 is a diagram illustrating the state of an MTF properties table in a control PC according to the second embodiment of the present invention.

FIG. 19 is a flowchart illustrating the processing performed in the control PC 400. FIG. 20 is a flowchart illustrating processing performed by the image processing apparatus 301 that undergoes the MTF adjustment. Requests to obtain the MTF correspondence tables are output from the control PC 400 to each MFP/scanner device registered in the group (S600).

Each MFP/scanner device receives the MTF adjustment request (S700), and in response, sends its own MTF parameter information (initial MTF, target MTF, necessary number of images) and its own scanner type information (S701).

The control PC 400 receives the MTF parameter information and the scanner type from the MPFs/SFPs within the group (S601). Then, the MTF properties table is expanded based on the scanner type that has been sent (S602). In step S602, the MTF adjustment application sets, in the present example, the lowest target MTF among the target MTFs for each scanner registered in the group as the common target MTF for that group, and stores that determined target MTF. When the MTF parameter information for the scanners belonging to the group is as shown in FIG. 21, 60 is the lowest MTF, and thus the adjusted target MTF value is set to 60. Of course, other determination methods may be selected, such as using the highest MTF, setting an average value, setting a mode value, and so on. An MFP/scanner device using a scanner with a low target MTF experiences a larger burden in the super-resolution processing if a higher target value is newly set, and thus the lowest target value is set in the present embodiment.

In response to the newly-set target MTF, the MTF adjustment application refers to the MTF properties table for each scanner type that has been sent, and calculates a new image number for the target MTF (S603). This is the same procedure as in the first embodiment. The equation for this calculation is (new target MTF value/previous target MTF value)* (previous number of images). In the present embodiment, the new target MTF value is set to 60. The initial target MTF value of the MFP 301 is 70, and the number of low-resolution images necessary therefor is 16. For this reason, the number of images necessary in the super-resolution processing performed by the image processing apparatus 301 with a scanner type of 200 is (60/70)*16, or 13.714; because these are whole images, the result is rounded up to the nearest whole number, or to 14, and that number is set. When the number of images necessary for the super-resolution processing under the new target MTF is calculated, the information of the calculated number of images is sent from the control PC to each MFP/scanner device (S604). For image processing apparatuses whose target MTF will not chance, the previous number of images is notified as-is.

Note that if the MTF properties table is created and saved in the control PC 400 for all scanner types in the group according to the procedure in the first embodiment, the number of pieces of low-resolution image data corresponding to the new target MTF can also be re-set through the same procedure as in the first embodiment.

Upon receiving the stated notification of the number of images, each MFP/scanner device overwrites the values in its own table with the received target MTF value and necessary number of low-resolution images. For example, the image processing apparatus 301 receives the new image number settings from the control PC 400 (S702), and stores that image number in the non-volatile RAM (S703).

After the stated adjustment control, when the MFPs/scanner devices in the group perform their reading processes in response to the operator, the super-resolution processing is performed using the newly-set number of low-resolution images, thereby generating image data with matching target MTFs across the entire group.

(Third Embodiment)

Figure 22:
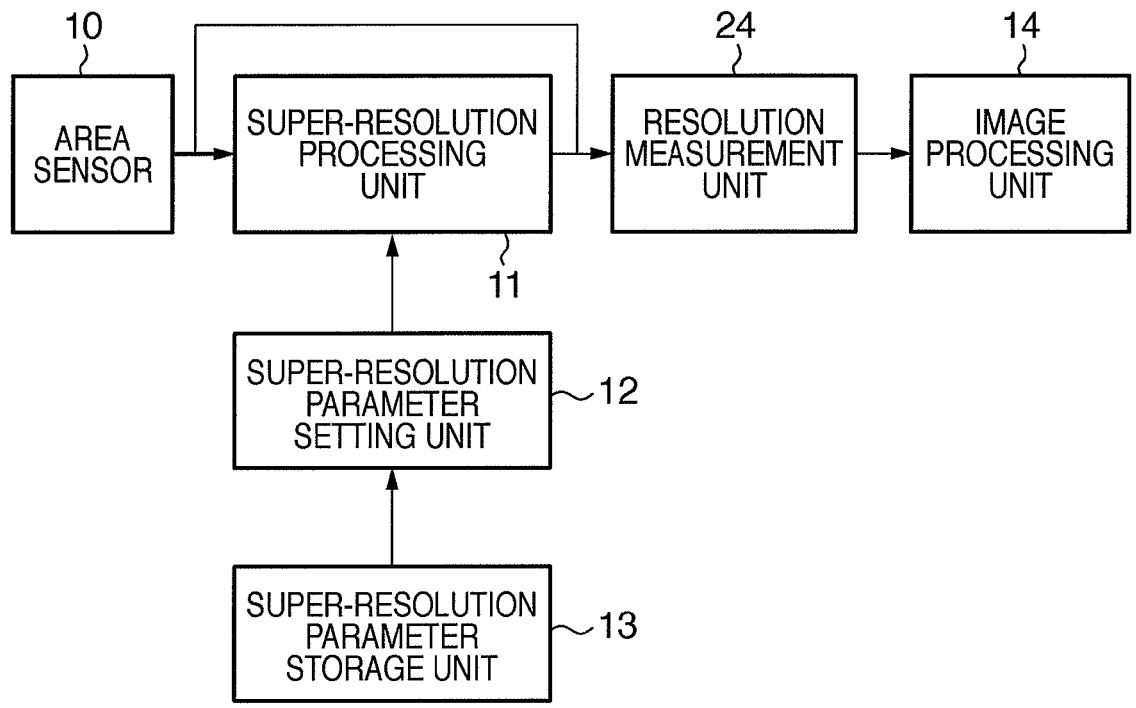
FIG. 22 is a block diagram illustrating a scanner unit of an image processing apparatus according to a third embodiment of the present invention.

Next, a method for maintaining a constant MTF in generated image data by changing the number of low-resolution images in the super-resolution processing in response to MTF degradation caused by deterioration over time in the scanner shall be described as a third embodiment of the present invention. The scanner unit of an image processing apparatus according to the present embodiment is configured as shown in FIG. 22. A resolution measurement unit 24 is located in a later stage of the super-resolution processing unit 11, and thus MTF values can be measured during the reading process. In the present embodiment, the processing performed up until the shipping process is the same as that in the first embodiment, and thus detailed descriptions thereof shall be omitted.

<Procedure for Setting Super-Resolution Parameters in Shipping Process>

Figure 23:
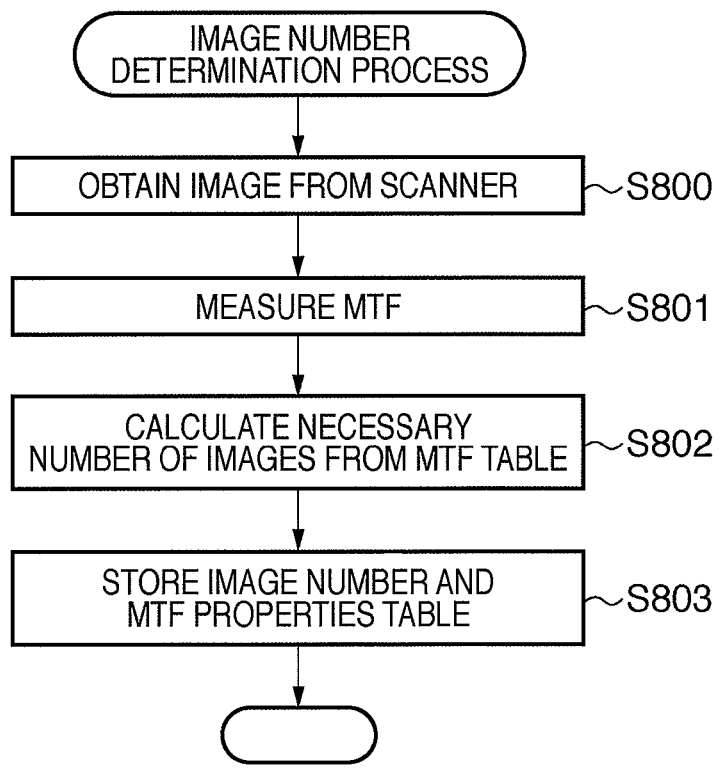
FIG. 23 is a flowchart illustrating a procedure for making super-resolution parameter settings at the shipping stage according to the third embodiment of the present invention.
Figure 24:
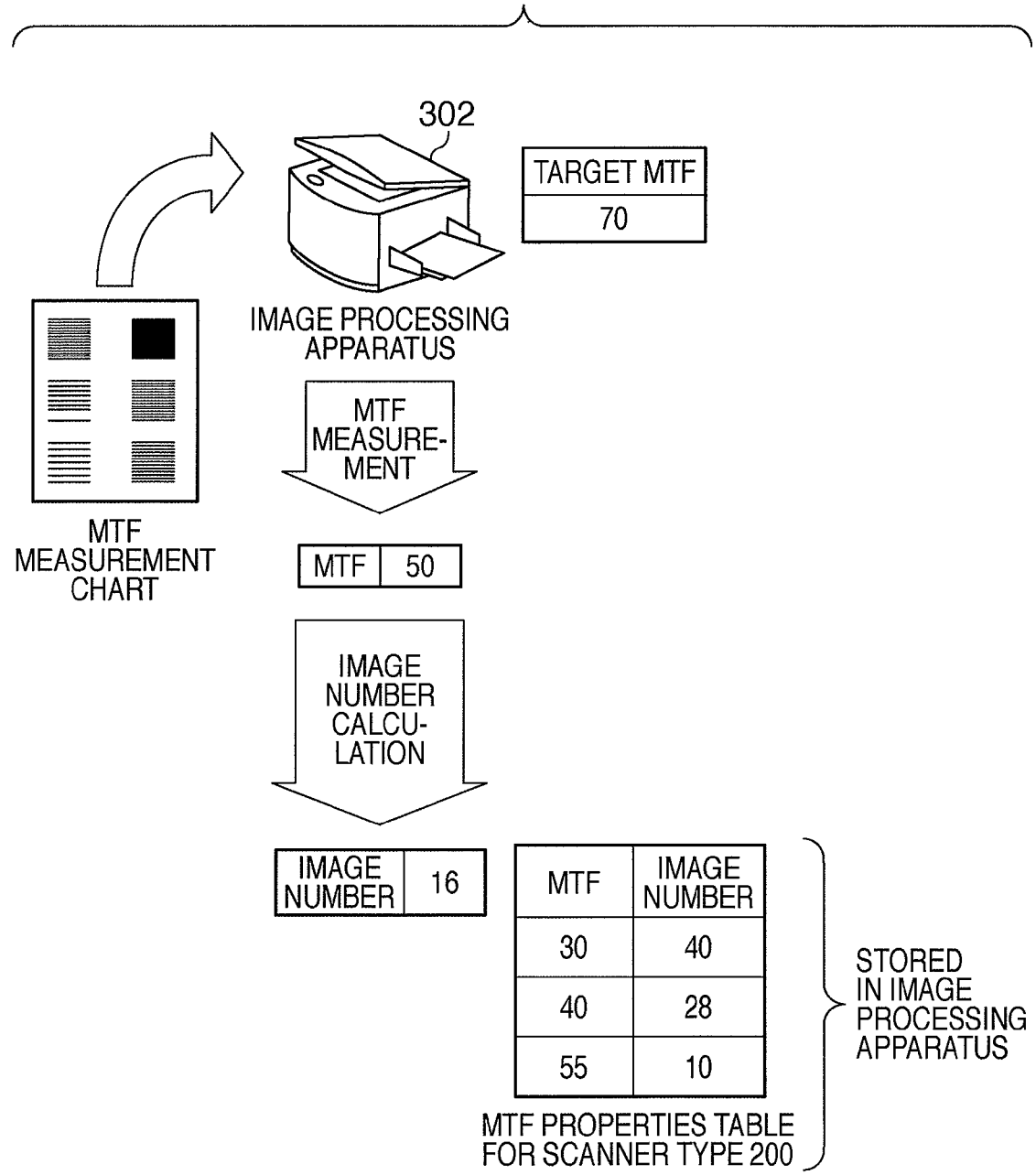
FIG. 24 is a diagram schematically illustrating a procedure for making super-resolution parameter settings at the shipping stage according to the third embodiment of the present invention.
Figure 25:
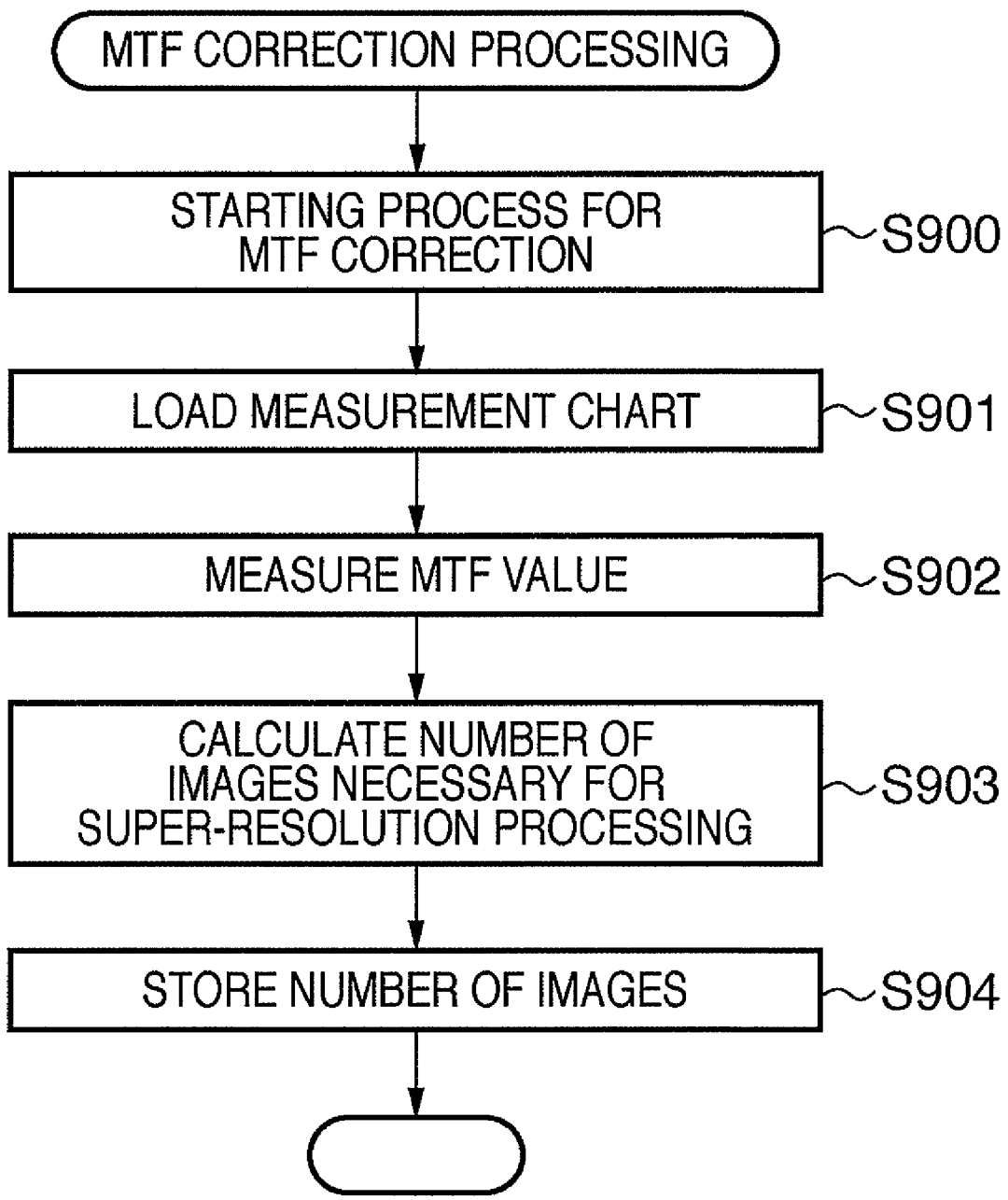
FIG. 25 is a flowchart illustrating MTF correction processing performed by a user according to the third embodiment of the present invention.

The parameter setting procedure in the shipping process shall be described using the block diagram of the scanner unit in FIG. 22, the flowchart in FIG. 23, and the schematic diagram in FIG. 24. In the shipping process, an image processing apparatus 302 loads an MTF measurement chart (S800), and measures the MTF using an MTF measurement device (S801). It is assumed that as a result, the initial reading MTF value is 50. Then, the necessary number of images for super-resolution processing under an initial MTF value of 50 is calculated, with respect to a target MTF value (for example, 70) from the MTF properties table for the included scanner type of 200 (S802), and a result of, for example, 16 is calculated, as shown in FIG. 24.

At this time, the necessary number of images for super-resolution processing corresponding to the target MTF value, or 16, as reading parameters and an MTF properties table corresponding to its own scanner type are stored in a non-volatile RAM in the image processing apparatus 302 (S803). As described in the first embodiment, the MTF properties table is a table made up of multiple combinations of the number of images necessary in super-resolution processing with respect to initial and target MTFs, on a scanner type-by-scanner type basis. The MTF properties table expresses variances in the initial MTF of that scanner type and the number of images necessary in the super-resolution processing corresponding thereto.

<MTF Correction Processing in Environment Used by User>

When an image is read by the image processing apparatus 300 immediately after shipment, the super-resolution processing is performed based on the number of low-resolution images stored in the device, and the image data is generated. Thus far, this is identical to the first embodiment.

Next, an MTF correction process performed in the case where the MTF of read images has dropped due to degradations in the reading elements and light source of the scanner after a certain amount of time has passed in an environment where the scanner is used by a user shall be described. In the present embodiment, the MTF correction is started by the user, but a display prompting the correction process to be performed may be shown when a process for reading a certain pre-set number of images has been performed. In the present embodiment, the user uses an MTF measurement chart to measure the current MTF value. Descriptions shall be given hereinafter using the block diagram in FIG. 22 and the flowchart in FIG. 25.

First, the user instructs the MTF correction to start (S900). The MTF measurement chart is then loaded from the scanner unit (S901). The loaded image data is transferred from the area sensor 10 to the MTF measurement unit 24 shown in FIG. 22. The method for measuring the MTF uses the predetermined measurement chart, calculating the resolution of the reading unit based on the result of reading the measurement chart (S902). The detailed method for measuring the MTF may be the same as that in the first embodiment, and as descriptions thereof deviate from the main scope of the present application, such descriptions shall be omitted.

When the current MTF value is calculated based on the MTF measurement chart, the number of images necessary for the super-resolution processing in order to achieve the target MTF is calculated using the MTF properties table (S903). Here, an example in which a scanner of the scanner type 200 whose initial MTF value of 50 at the time of shipping has dropped to 45 shall be described. In this case, the number of pieces of low-resolution image data for an MTF value of 45 is calculated using the MTF properties table stored in the non-volatile RAM. As with the calculation of the number of images performed thus far, this number is calculated through a linear computation based on the nearest value; for example, the number of low-resolution images for an initial MTF of 40 is 28 and the number of low-resolution images for an initial MTF of 50 is 16, as seen in the MTF properties table in FIG. 24, and thus the number of necessary images for an MTF of 45 is 22. Because the calculation results in 22 images being necessary for the super-resolution processing, 22 is stored in the non-volatile RAM as the new value for the image number 205 (S904).

When a new reading process is carried out thereafter, the super-resolution processing is performed using the newly-set number of images, and thus the MTF, which has degraded over time, is corrected, making it possible to obtain image data with the same MTF as when the scanner was first shipped.

Note that the super-resolution processing in the embodiments may use the method disclosed in WO 2004-068862. Furthermore, the processing performed by the computer, such as the generation of the MTF properties table, may be performed by the image processing apparatus rather than by the computer.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-220498, filed Aug. 28, 2008, which is hereby incorporated by reference herein in its entirety.

What is claimed is:

1. An information processing apparatus comprising:
    a table, configured to save a first Modulation Transfer Function (MTF) value in association with a number of pieces of low-resolution image data, used to obtain the first MTF value, necessary when generating, though super-resolution processing using the low-resolution image data, high-resolution image data used to obtain a second MTF value that is higher than the first MTF value;
    a determination unit, configured to obtain information indicating the resolution of an image read without performing super-resolution processing from an image reading apparatus having a super-resolution processing function, and determine a number corresponding to the resolution by referring to the table;
    a unit, configured to output the number determined by the determination unit;
    a unit, configured to obtain the MTF value obtained from image data read by the image reading apparatus as the first MTF value, perform the super-resolution processing with the image reading apparatus changing the number of pieces of the image data, and obtain the MTF value obtained from the high-resolution image data in association with the number; and
    a unit, configured to judge whether the obtained MTF value obtained from the high-resolution image data has achieved a target MTF value, and register, in the table, a number associated with the MTF value that achieves the target MTF value in association with the first MTF value.

2. The information processing apparatus according to claim 1,
    wherein numbers corresponding to each of multiple MTF values are saved in the table; and
    the determination unit determines, as the number corresponding to the MTF value, the number corresponding to the obtained MTF value, if that number is registered in the table, and a number obtained by interpolating two numbers respectively corresponding to two MTF values near the obtained MTF value, if that number is not registered in the table.

3. The information processing apparatus according to claim 1,
    wherein the first MTF value and the number of pieces of low-resolution image data are registered in the table for each of multiple types of image processing apparatus; and the determination unit determines, for each of the multiple types of image processing apparatus, the number of pieces of low-resolution image data for generating, through the super-resolution processing, high-resolution image data having the second MTF value common across the multiples types of image processing apparatus.

4. A control method for an information processing apparatus, the information processing apparatus including a table that saves a first Modulation Transfer Function (MTF) value in association with a number of pieces of low-resolution image data, used to obtain the first MTF value, necessary when generating, though super-resolution processing using the low-resolution image data, high-resolution image data used to obtain a second MTF value that is higher than the first MTF value, and the method comprising the steps of:
obtaining information indicating the MTF value obtained from an image read without performing super-resolution processing from an image reading apparatus having a super-resolution processing function, and determining a number corresponding to the MTF value by referring to the table;

outputting the number determined in the step of obtaining and determining;

obtaining the MTF value obtained from image data read by the image reading apparatus as the first MTF value, performing the super-resolution processing with the image reading apparatus changing the number of pieces of the image data, and obtaining the MTF value obtained from the high-resolution image data in association with the number; and judging whether the obtained MTF value obtained from the high-resolution image data has achieved a target MTF value, and registering, in the table, a number associated with the MTF value that achieves the target MTF value in association with the first MTF value.

* * * * *